US008190993B2

(12) United States Patent (10) Patent No.: US 8,190,993 B2
Kondo et al. (45) Date of Patent: May 29, 2012

(54) MENU SELECTION USING A ROTATING DIAL AND BUTTON

(75) Inventors: Hirohito Kondo, Chiba (JP); Tomoki Shiono, Kanagawa (JP); Yoshihiro Yamaguchi, Tokyo (JP); Takahiko Sueyoshi, Tokyo (JP)

(73) Assignee: Sony Corporation, Tokyo (JP)

( * ) Notice: Subject to any disclaimer, the term of this patent is extended or adjusted under 35 U.S.C. 154(b) by 646 days.

(21) Appl. No.: 11/099,136

(22) Filed: Apr. 5, 2005

(65) Prior Publication Data

US 2005/0183040 A1  Aug. 18, 2005

Related U.S. Application Data

(63) Continuation of application No. 09/651,201, filed on Aug. 30, 2000, now abandoned.

(30) Foreign Application Priority Data

Aug. 31, 1999 (JP) .................................. 11-246483

(51) Int. Cl.
   *G06F 3/048* (2006.01)
   *G06F 3/00* (2006.01)
   *G06F 3/033* (2006.01)
(52) U.S. Cl. ........ 715/700; 715/810; 715/764; 715/829; 715/834; 715/830; 715/833; 345/157
(58) Field of Classification Search .................. 715/700, 715/810, 764, 834, 829, 830, 833; 707/1; 345/157
   See application file for complete search history.

(56) References Cited

U.S. PATENT DOCUMENTS

| | | | | |
|---|---|---|---|---|
| 4,131,033 A | * | 12/1978 | Wright et al. | 74/553 |
| 4,138,014 A | * | 2/1979 | Bouman | 206/542 |
| 5,170,689 A | * | 12/1992 | Dvorak | 83/515 |
| 5,189,355 A | * | 2/1993 | Larkins et al. | 318/685 |
| 5,283,606 A | * | 2/1994 | Konno et al. | 396/299 |
| 5,430,511 A | * | 7/1995 | Paff et al. | 396/427 |
| 5,497,455 A | | 3/1996 | Suga et al. | |
| 5,559,945 A | | 9/1996 | Beaudet et al. | |
| 5,627,531 A | * | 5/1997 | Posso et al. | 341/22 |
| 5,666,477 A | | 9/1997 | Maeda | |
| 5,704,051 A | | 12/1997 | Lane et al. | |
| 5,808,434 A | * | 9/1998 | Kokura et al. | 318/569 |
| 5,808,602 A | * | 9/1998 | Sellers | 345/157 |
| 5,856,827 A | | 1/1999 | Sudo | |
| 5,903,229 A | * | 5/1999 | Kishi | 341/20 |
| 5,926,178 A | | 7/1999 | Kurtenbach | |
| 6,072,492 A | | 6/2000 | Schagen et al. | |
| 6,075,925 A | * | 6/2000 | Downing et al. | 358/1.1 |

(Continued)

*Primary Examiner* — Simon Ke
*Assistant Examiner* — Erik Stitt
(74) *Attorney, Agent, or Firm* — Frommer Lawrence & Haug LLP; William S. Frommer; Russell P. Blaise

(57) ABSTRACT

A system and method for making menu items easily adjustable on the setting screen of a camera with regard to the predetermined object to be operated. The camera setting utility screen for the CCD camera is displayed on the liquid crystal display any one of the plural number of menu items is selected from said camera setting utility screen displayed according to the rotation operation and the push operation of the jog dial. The setting condition with regard to the menu item selected is adjusted corresponding to the rotation operation and the push operation of the jog dial. The CCD camera is set to the setting condition adjusted, such that operation of selection of menu item to the adjustment of setting condition can be conducted merely by the rotation operation and the push operation of the jog dial.

3 Claims, 30 Drawing Sheets

U.S. PATENT DOCUMENTS

| | | | |
|---|---|---|---|
| 6,128,553 A * | 10/2000 | Gordon et al. | 701/3 |
| 6,154,201 A * | 11/2000 | Levin et al. | 345/184 |
| 6,161,126 A * | 12/2000 | Wies et al. | 709/203 |
| 6,208,341 B1 | 3/2001 | van Ee et al. | |
| 6,211,921 B1 * | 4/2001 | Cherian et al. | 348/565 |
| 6,229,456 B1 * | 5/2001 | Engholm et al. | 341/35 |
| 6,353,430 B2 * | 3/2002 | Cheng et al. | 345/161 |
| 6,396,006 B1 * | 5/2002 | Yokoji et al. | 200/4 |
| 6,433,797 B1 | 8/2002 | Zellweger | |
| 6,476,794 B1 | 11/2002 | Kataoka et al. | |
| 6,519,003 B1 * | 2/2003 | Swayze | 348/375 |
| 6,636,197 B1 | 10/2003 | Goldenberg et al. | |
| 6,683,653 B1 * | 1/2004 | Miyake et al. | 348/373 |
| 6,686,911 B1 | 2/2004 | Levin et al. | |
| 7,058,903 B1 * | 6/2006 | Jonach et al. | 715/834 |
| 7,093,201 B2 * | 8/2006 | Duarte | 715/853 |
| 7,333,092 B2 * | 2/2008 | Zadesky et al. | 345/169 |
| 7,577,970 B2 * | 8/2009 | Jarman | 725/25 |

\* cited by examiner

IN THE CASE OF RIGHT TURN (ARROW A DIRECTION)

IN THE CASE OF LEFT TURN (ARROW B DIRECTION)

MENU SELECTION USING A ROTATING DIAL AND BUTTON

This application is a continuation of U.S. application Ser. No. 09/651,201, filed Aug. 30, 2000, now abandoned, which application is hereby incorporated by reference in its entirety herein.

BACKGROUND OF THE INVENTION

1. Field of the Invention

The present invention relates to an information processing device, an information processing method and a program storage medium, and more particularly, is suitably applied to a notebook type personal computer device.

2. Description of the Related Art

In recent years a notebook type personal computer (hereinafter referred to as notebook PC) equipped with a small charge coupled device (CCD) camera has been developed. And the usage, such as attaching the image data photographed by the CCD camera to the electronic mail and transmitting this electronic mail has been generally conducted.

In practice, in the case where the user photographs a subject, after setting the picture quality and various kinds of modes of the CCD camera on the notebook PC screen, the user starts taking photos. At this point, in the dialog box (setting screen) to set the quality of picture, multiple menu items, such as "brightness", "contrast", "hue", "darkness of color" and "sharpness" are provided and a slide bar for adjustment is provided per each menu item.

Accordingly, when the user conducts the setting of the picture quality and a variety of modes of the CCD camera, after opening the exclusive dialog box on the display screen and selecting the desired menu item by operating the mouse, the user adjusts the setting condition matching the pointer to the slide bar of the menu item selected by operating the mouse by drag and drop.

However, in such constructed notebook PC, since there exist numerous number of menu items for conducting the settings of picture quality and various modes, if all settings of menu items are conducted by drag and drop operation, it has created a problem negatively affecting the operability.

Especially, in the notebook PC, a stick-type pointing device provided on the middle part of the keyboard is pushed up and down, and right and left, and the left click button and the right click button placed on the front side of the keyboard are pushed and the whole processing from the selection of menu item to the adjustment of the slide bar should be conducted by the stick-type pointing device and the left click button and the right click button. It has created a problem that the operability has become worse.

SUMMARY OF THE INVENTION

In view of the foregoing, an object of this invention is to provide an information processing device and information processing method and a program storage medium having excellent operability capable of adjusting the setting condition with regard to menu items easily on the setting screen for the predetermined object to be operated.

The foregoing objects and other objects of the invention have been achieved by the provision of an information processing device and information processing method and a program storage medium, wherein the setting screen for the predetermined object to be operated is displayed on the display screen, any one of multiple menu items is selected from the setting screen displayed according to the rotation operation and the push operation by the predetermined selecting/adjusting means, the setting condition with regard to the menu item selected is adjusted according to the rotation operation and the push operation by the selecting/adjusting means, and the object to be operated is set to the setting condition adjusted. Thus, the whole processing from the menu item selection to the setting condition adjustment can be done by the rotation operation and the push operation of the selecting/adjusting means.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Preferred embodiments of this invention will be described with reference to the accompanying drawings:

(1) Construction of Notebook PC Attached with Jog-Dial

Figure 1:
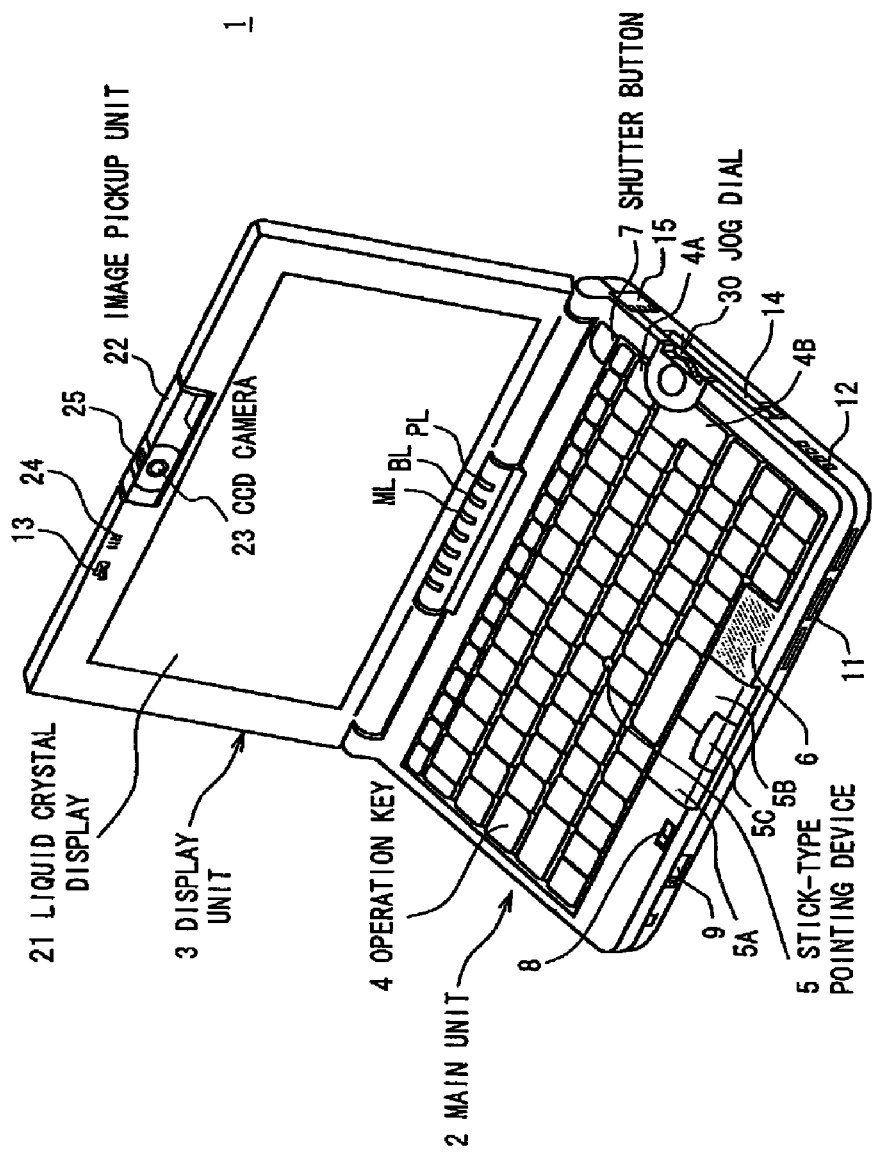
FIG. 1 is a brief linear diagram showing the general construction of a notebook PC equipped with a job dial according to the present invention.

In FIG. 1, 1 generally shows a notebook type personal computer attached with a jog dial (hereinafter referred to as notebook PC with jog dial) comprising the information processing device of the present invention. And this notebook PC is comprised of a main unit 2 and a display unit 3 attached opening-closing free to the main unit 2.

In the main unit 2 the plural number of operation keys 4 for entering various characters, symbols and numbers, a stick type pointing device (hereinafter referred to as stick) 5 to be used for moving the mouse cursor, a left click button 5A and a right click button 5B which are equivalent to the left button and right button of the normal mouse, a center button 5C for operating the scroll bar without matching the mouse cursor to the scroll button, a built-in speaker 6, and a shutter button 7 for the CCD camera 23 provided on the display unit 3 are provided on the upper surface of the main unit 2.

In the display unit 3, a liquid crystal display 21 is provided in the front surface and an image-pickup unit 22 having the CCD camera 23 attached rotation-free to the display unit 3 on the center upper edge part of the front surface.

More specifically, the image pickup unit 22 rotates within the angle range of 180° between the front direction and the rear direction of the display unit 3 and can be positioned at the optional position within the angle range. Moreover, the image pickup unit 22 is equipped with an adjusting ring 25 for conducting the focus adjustment of the CCD camera. And in the case of photographing the desired object by the CCD camera 23, the focus adjustment can be easily conducted by the rotation operation of the adjusting ring 25.

Furthermore, in the display unit 3, a microphone 24 is provided on the vicinity of left side of the image pickup unit 22 and sounds can be also collected from the rear side of the display unit 3 through this microphone 24.

Furthermore, in the display unit 3, a lug 13 is provided on the left side of the microphone 24 and a hole 8 is also provided on the predetermined position of the main unit 2 corresponding to the lug 13. And this lug 13 is fit into the hole 8 and locked.

The main unit 2 is equipped with a slide lever 9 in the front side surface. And by releasing the lock of the lug 13 fit into the hole 8, the display unit 3 can be opened to the main unit 2.

Moreover, multiple aspiration holes 11 are provided on the front side surface of the main unit 2.

Furthermore, on the right side surface of the main unit 2, an exhaust hole 12, a PC card slot 14 compatible with the PC card of the Personal Computer Memory Card International Association (PCMCIA) standard, and a modem terminal for modular jack 15 are provided.

Figure 2:
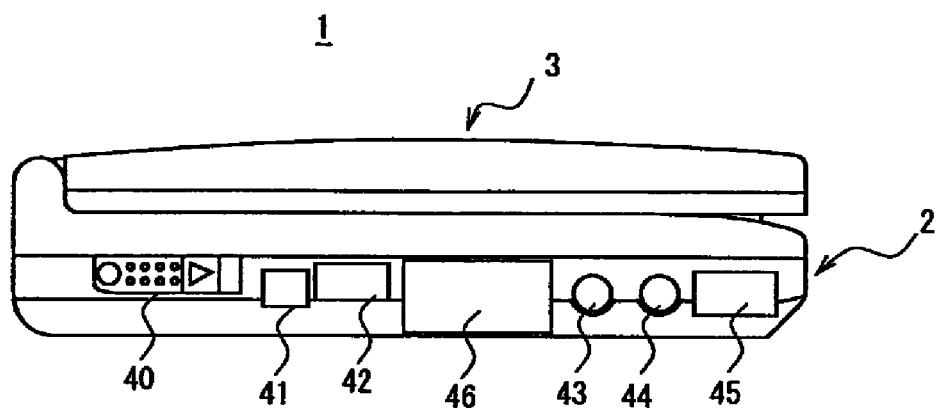
FIG. 2 is a side view showing the construction of left side surface of the main unit.

On the other hand, as shown in FIG. 2, a sliding power source switch 40, a 4-pin capable Institute of Electrical and Electronics Engineers (IEEE) 1394 terminal 41, a Universal Serial Bus (USB) terminal 42, a connector for external display 46, an input terminal for microphone 43, a headphone terminal 44 and an infrared port 45 compliant with Infrared Data Association (IrDA) are provided on the left side surface of the main unit 2.

Figure 3:
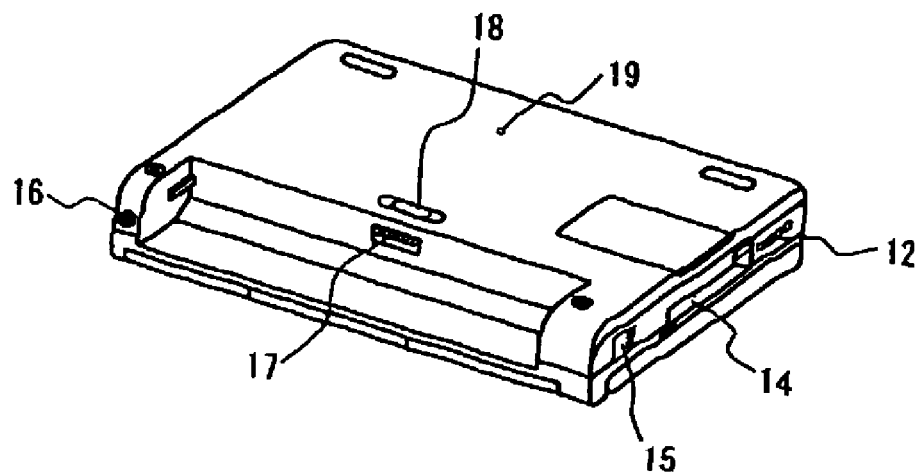
FIG. 3 is a brief linear diagram showing the construction of rear surface and bottom surface of the main unit.

Furthermore, as shown in FIG. 3, an external power source connector 16 is provided on the rear side surface of the main unit 2. And on the bottom surface a sliding removable lever 18 for removing the battery pack (not shown in FIG.), and a reset switch 19 for reconstructing the environment when the power source is put on after temporarily stopping the operation are provided. In this connection, the battery pack is connected removable free to the battery connector 17.

In addition to the above construction, a jog dial 30 is mounted into between an operation key 4A which is equivalent to the back space key and an operation key 4B which is equivalent to the enter key on the right edge part on the upper surface of the main unit 2 (FIG. 1) to become the same height as the operation keys 4A and 4B.

Here, this jog dial 30 is an user interface having excellent usability capable of easily realizing various functions in the system setting and various application softwares by rotation operating and push operating the dial.

Figure 4:
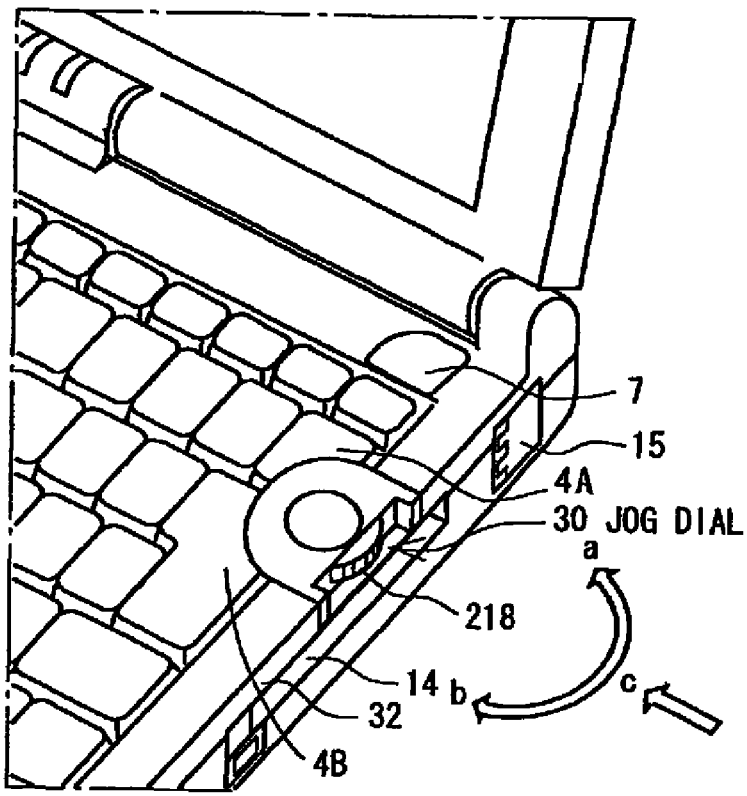
FIG. 4 is a brief linear diagram showing an external view of the jog dial attached to the main unit.

As shown in FIG. 4, this jog dial 30 is attached in a state in which a disc operation knob 218 having plain groove pattern is slightly protruded from the outside case 32 of the main unit 2. And this jog dial 20, conducting the predetermined processing in response to the rotation operation by the disc operation knob 218 in the direction shown by the arrow a or the arrow b, conducts the predetermined processing in response to the push operation in the arrow c direction.

(1-1) Construction of Jog Dial

Figure 5:
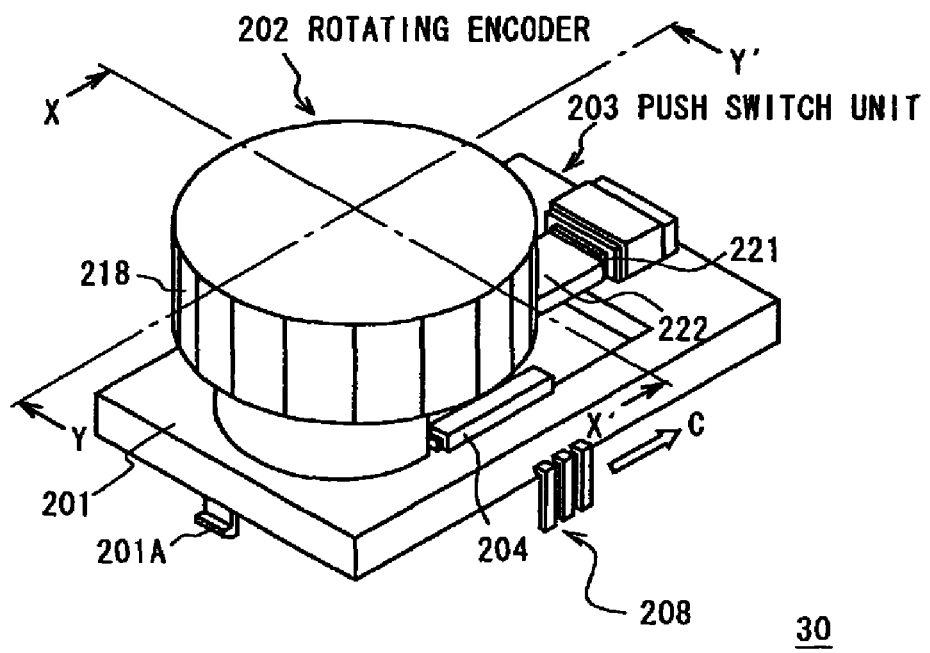
FIG. 5 is a brief linear diagram showing the general construction of the jog dial.

Next, the construction of jog dial 30 will be explained in detail referring to FIG. 5 to FIG. 11 in the following paragraphs. As shown in FIG. 5, the job dial 30 is comprised of a rotating encoder unit 202 as the rotating operation means movable in the arrow c direction by the user's push operation, and the push switch unit 203 fixed on that position as the push operating means are placed on the contact attaching substrate 201.

Figure 6:
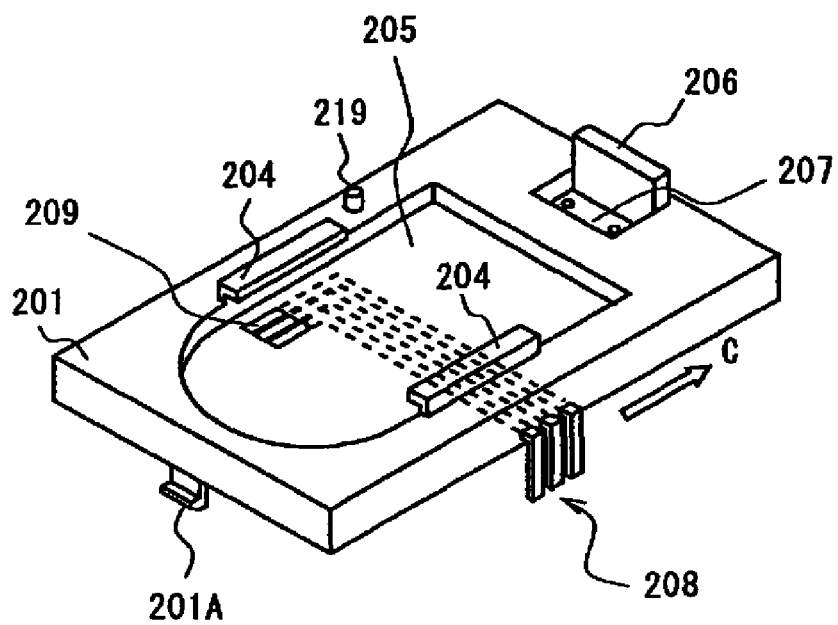
FIG. 6 is a brief linear diagram showing the construction of a contact attaching substrate.

The contact attaching substrate 201 is formed of resins of the plane plate shape as shown in FIG. 6, and equipped with a cave for moving 205 on which moving guide rail units 204 for moving the rotating encoder unit 202 (FIG. 5) in the arrow c direction are provided on both sides, and a cave for push/stopping 107 having the push/stopping wall 206 to which push switch 203 is put in and fixed. Moreover, a conductive contact plate 209 connected to a terminal 208 for transmitting an electric signal of the rotating encoder 202 to the outside is formed on the bottom surface of the cave for moving 205.

Figure 7:
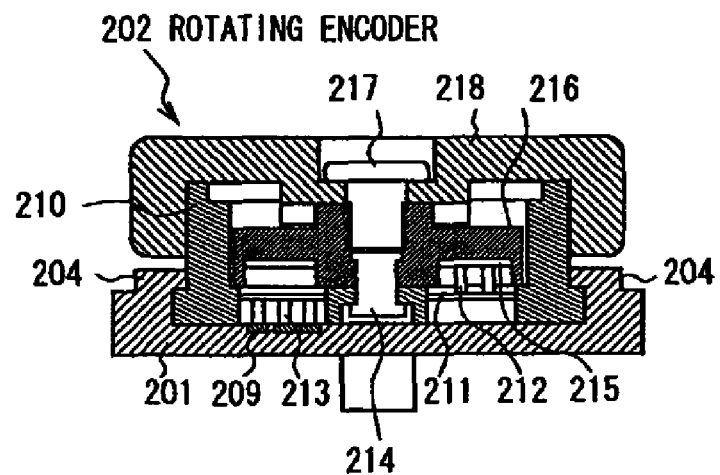
FIG. 7 is a brief linear cross sectional view showing the internal construction of the jog dial (1)
Figure 8:
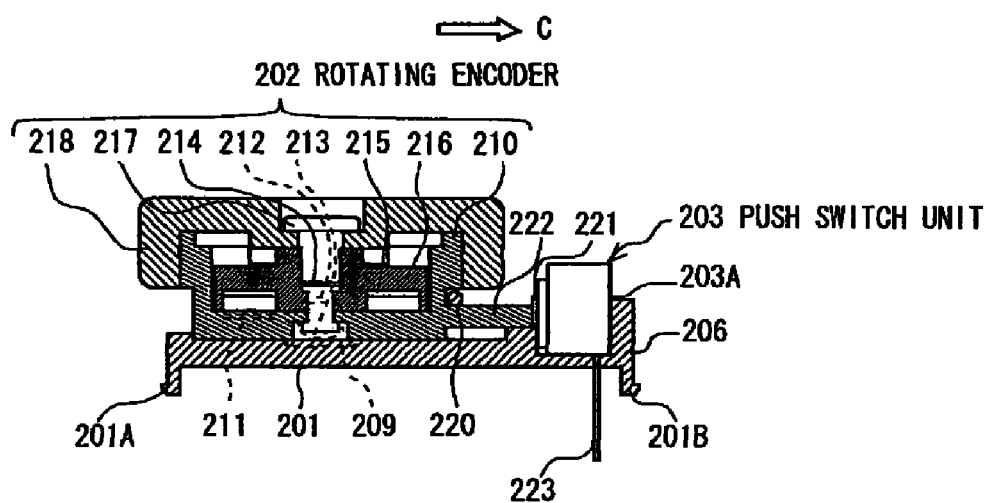
FIG. 8 is a brief linear cross sectional view showing the internal construction of the jog dial (2)

FIG. 7 is a cross sectional view of the jog dial 30 taken on the line X-X' of FIG. 5 and FIG. 8 is a cross sectional view of the jog dial 30 taken on the line Y-Y'. As shown in FIGS. 7 and 8, the rotating encoder unit 202 comprises a resin box case 210 placed on the contact attaching substrate 201 so as to be able to move within the fixed range in the arrow c direction via the guide rail 204 in a state mounted into the cave for moving 205 of the contact attaching substrate 201, elastic contact legs 212, 213 thrusting upward and downward respectively from the elastic contact body 211 inserted to the bottom surface of the box case 210, a resin rotating body 216 held movable by a cylinder shaft 214 integrated in the center of the box type case 210 and having a radial contact plate 215 to contact to the elastic contact leg 213, and the rim operation type disc shaped operation knob 218 attached to the rotating body 216 with the screw 217 for the user's rotation operation.

In the rotating encoder unit 202 thus constructed, the box type case 210 mounted to the inner side of the disc shape operation knob 218 is urged in the opposite direction to the arrow c direction (i.e., in the direction away from the bush switch unit 203) by a screw coil spring 220 (FIGS. 8 to 11) positioned by the pin shape projection 219 provided on the predetermined position on the contact attaching substrate 201 (FIG. 6), and the elastic contact leg 213 projected downward from the bottom surface of the box case 210 is contacted to the contact plate 209 of the contact attaching substrate 201.

Moreover, in the push switch unit 203 (FIG. 8), the operation button 221 is placed on the position facing to the rotating encoder 202 and the rear edge surface 203A is fixed into the push-stop cave 207 of the contact attaching substrate 201 in order to contact to the push stop wall 206. At this point, in the rotation encoder unit 202, the driving projection unit 2, formed integrated with the box case 210 contacts to the tip of the operation button 221 of the push switch 203.

Figure 9:
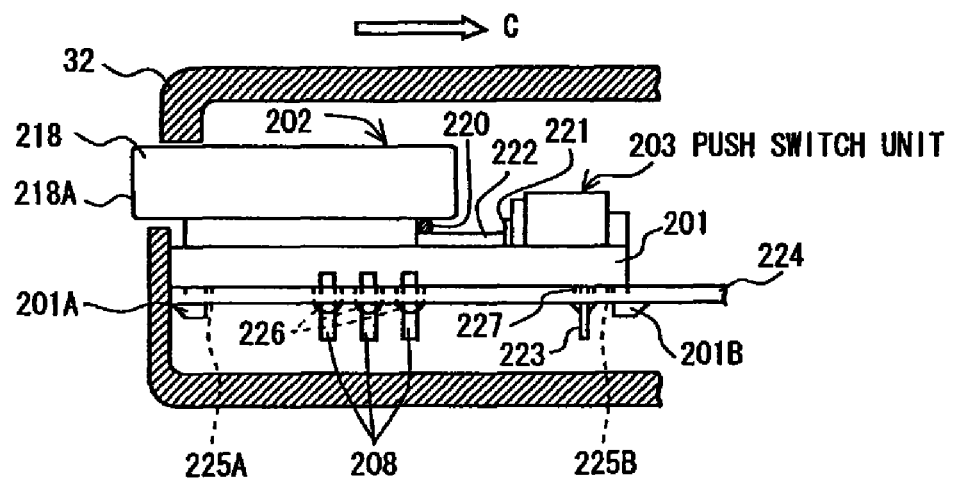
FIG. 9 is a brief linear cross sectional view showing the attaching condition of the jog dial.

In the case where practically such job dial 30 is attached to the electronic equipment, as shown in FIG. 9, terminals 201A and 201B provided on the bottom surface side of the contact attaching substrate 201, the connecting terminal 208 of the rotation encoder unit 202 and the connection terminal 223 of the push switch unit 203 are solder connected in a state in which these are being inserted into the mounting holes 225A, 225B, 226 and 227 of the print wiring substrate 224 of the electronic equipment.

Since the jog dial 30 is attached so that the disc operation knob 218 is slightly projected from the outer case 32 of the main unit 2, the user can easily operate the disc operation knob 218 projected in creeping about the circular side surface 218A of the outside case 32 (FIG. 4) with his finger. Thus, the disc operation knob 218 can be made thin provided that the rigidity can be maintained, and thus, can cope with sufficiently making the main unit 2 thinner.

Figure 10:
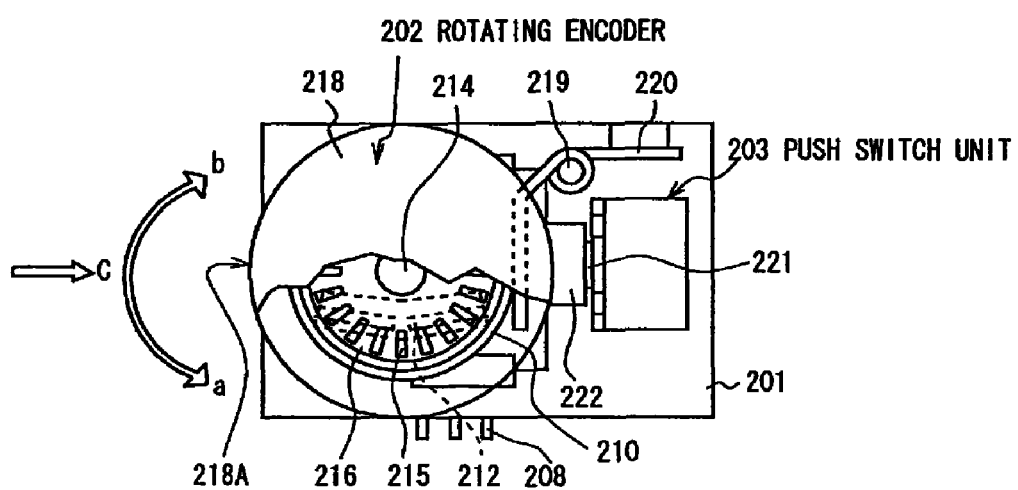
FIG. 10 is a brief linear diagram illustrating the operation of rotating encoder unit.

Next, the function of the jog dial 30 will be described referring to FIGS. 10 and 11 as follows. As shown in FIG. 10, when the force is exerted in the tangental direction (the arrow a direction or the arrow b direction) to the circular side surface 218A of the disc operation knob 218 in the rotating encoder unit 202, the rotating body 216 rotates centering around the cylinder shaft 214 of the middle of the box case 210. And the elastic contact leg 212 contacting to multiple radical contact bodies 215, drives these, pulse signal interlocked to the rotation operation of the disc operation knob 218 is generated.

Then, the jog dial 30 transmits the pulse signal generated to the elastic contact leg 213 from the elastic contact leg 212 (FIGS. 7 and 8) via the elastic contact body 211. And after transmitting this to the contact plate 209 of the contact attaching substrate 201 to which the elastic contact leg 213 is attached, transmits the pulse signal to the circuit of the print wiring substrate 224 in the notebook PC 1 via the outside connecting terminal 208 (FIG. 9).

Figure 11:
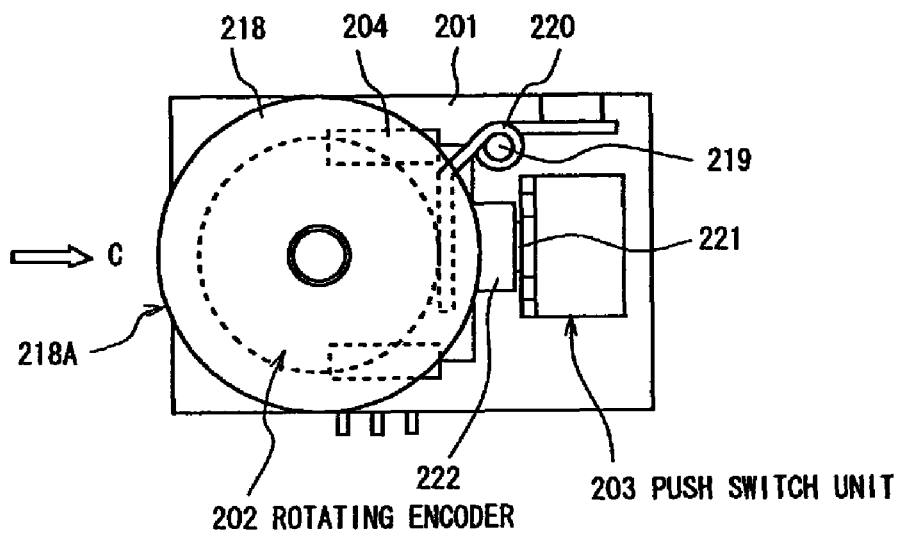
FIG. 11 is a brief linear diagram illustrating the operation of the push switch unit.

Moreover, as shown in FIG. 11, the jog dial 30, by giving the pushing power in the arrow c direction to the circular side surface 218A of the disc operation knob 218 against the spring tension of the screw coil spring 220 attached to the contact attaching substrate 201 and moving the whole rotating encoder unit 202 along the guide rail 204 of the contact attaching substrate 201, pushes the operation button 221 by using the driving projection unit 222 integrated with the box case 210 and puts the push switch unit ON operating.

With this arrangement, the jog dial 30 transmits the push operation signal to be generated by ON operating the push switch unit 203 to the circuit of the print wiring substrate 224 in the notebook PC 1 via the connecting terminal 223 (FIGS. 8 and 9).

When the jog dial 30 releases the pushing power given to the circular side surface 218A of the disc operation knob 218, the rotation encoder unit 202 is pushed back in the opposite direction to the arrow c direction by the elastic restoring power of the screw coil spring 220 attached to the contact attaching substrate 201 and restored to the original state.

(1-2) Circuit Construction of Notebook PC Attached with Jog Dial

Figure 12:
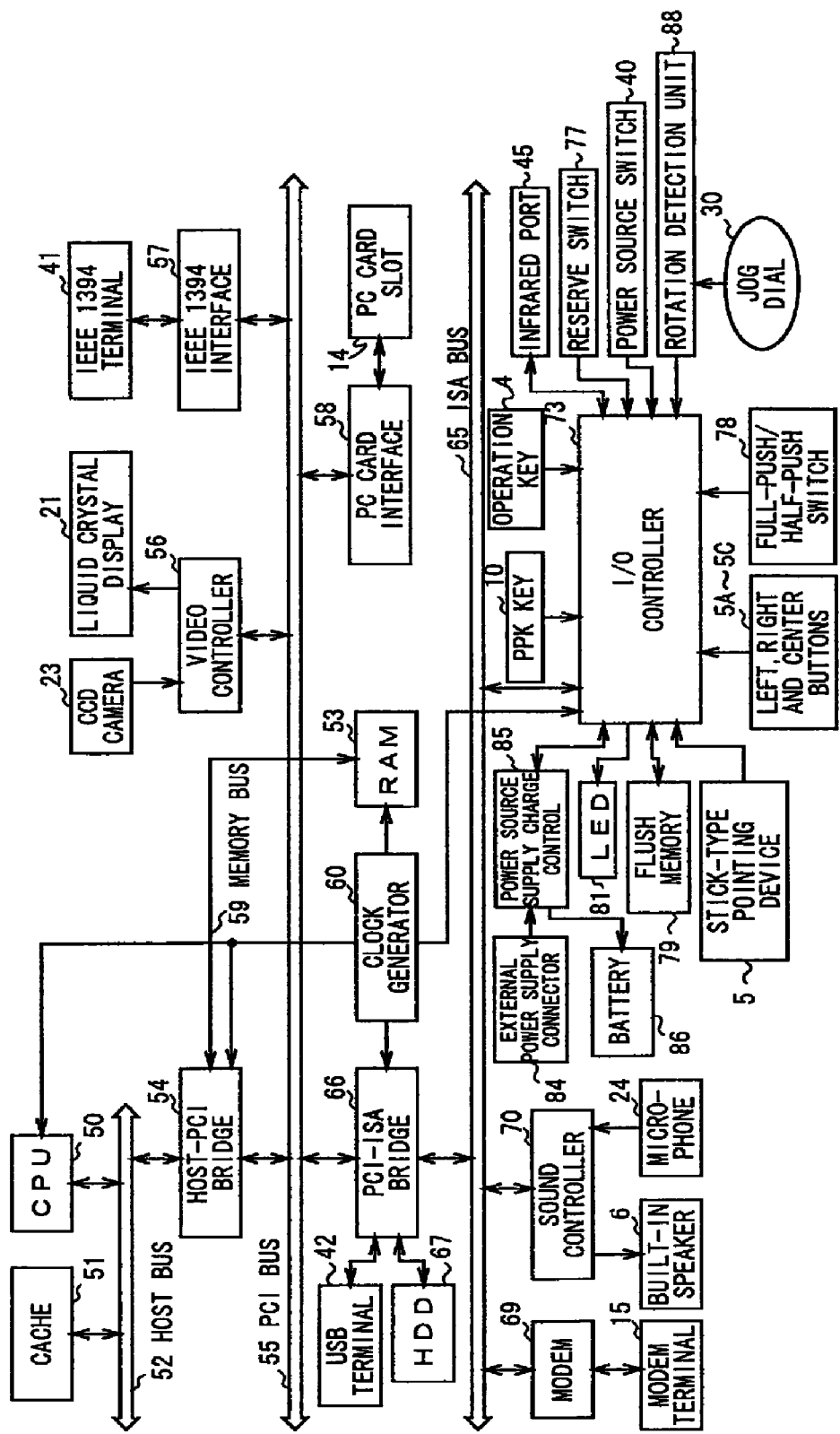
FIG. 12 is a block diagram showing the circuit construction of the notebook PC attached with jog dial.

As shown in FIG. 12, in the main unit 2 of the notebook PC 1, the Central Processing Unit (CPU) 50 for controlling various functions of the main unit 2 is connected to a host bus 52, and by executing the processing based on various programs and application softwares loaded on the Random Access Memory (RAM) 53 by the CPU 50 at the predetermined operating speed based on the system clock to be given from the clock generator 60, various kinds of functions can be realized.

Furthermore, the host bus 52 is connected with a cache memory 51 and caches the data to be used by the CPU 50 and high velocity accessing can be realized.

This host bus 52 is connected to the Peripheral Component Interconnect (PCI) bus 55 via the host-PCI bridge 54, and the PCI bus 55 is connected to the video controller 56, Institute of Electrical Electronics Engineers (IEEE) 1394 interface 57, video capture processing chip 83 and the PC card interface 58.

This host-PCI bridge 54, as well as controlling various data receptions to be conducted between the CPU 50 and the video controller 56, the video capture processing chip 83, the IEEE 1394 interface 57 and the PC card interface 58, conducts the memory control of the RAM 53 connected via the memory bus 59.

Furthermore, the host-PCI bridge 54 is connected to the video controller 56 via the signal line and thus, image data can be transmitted between the host-PCI bridge 54 and the video controller 56 at high velocity.

The video capture processing chip 83 is connected to I$^2$C bus 82 formed of serial bus (generally called as system management (SM) bus) and when the image data photographed by the charge coupled device (CCD) camera 23 via the I$^2$C bus 82 is supplied, the video capture processing chip 83 stores this in the built-in frame memory (not shown in FIG.) once, and after forming JPEG image data by applying the image compression processing according to the Joint Photographic Experts Group (JPEG) standard, stores the JPEG data again in the frame memory.

Moreover, the video capture processing chip 83, after transmitting the JPEG image data stored in the frame memory directly to the RAM 53 using the bus master feature responding to the request from the CPU 50, transmits this to the hard disc drive (HDD) 67 as the JPEG image (still picture) data or the Motion JPEG image (moving picture) data.

The video controller 56, after applying the predetermined graphic processing to the image data photographed by the Charge Coupled Device (CCD) camera 23 and the JPEG image data of the video capture processing chip 83, stores these in the built-in Video Random Access Memory (VRAM)

and reads out as occasion demands, and outputting to the liquid crystal display 21, displays these.

Moreover, the video controller 56, by outputting the image data based on various kings of application softwares to be supplied as necessary to the liquid crystal display 21, can display multiple window screens.

The PC card interface 58 will be provided via the PC card at the time when an optional feature is added, and this can be connected to the external device such as the CD-ROM drive and the DVD drive via the PC card.

The IEEE 1394 interface 57 is directly connected to the IEEE 1394 terminal 41 and also can be connected to the external devices such as the other computer devices and the digital video camera via the IEEE 1394 terminal 41.

The PCI bus 55 is connected to the Industrial Standard Architecture (ISA) bus 65 via the PCI-ISA bridge 66, and HDD 67 and universal serial bus (USB) terminal 42 are connected to the PCI-ISA bridge 66.

Here, the PCI-ISA bridge 66 comprises an Integrated Drive Electronics (IDE) interface, configuration register, Real-Time Clock (RTC) circuit and USB interface, and controls the HDD 67 via the IDE interface based on the system clock to be supplied from the clock generator 60.

In the hard disc of HDD 67, operating system (OS) such as Windows98 (trade mark), electronic mail program, auto-pilot program, job dial utility program, jog dial driver, capture software and digital map software, and various other application softwares are memorized and will be transmitted to the RAM 53 in the process of start processing as occasion demands.

Moreover, the PCI-ISA bridge 66 controls external devices such as a floppy disc drive, a printer and USB mouse (not shown in FIG.) connected via the USB terminal 42 via the USB interface and also controls the modem 69 and the sound controller 70 connected to the ISA bus 65.

The modem 69 is connected to an internet service provider (hereinafter referred to as provider) from the modem terminal 1 via the public phone circuit (not shown in FIG.) and Internet, and conducts accessing between the provider. The sound controller 70 captures audio signal from the microphone 25 and supplies the audio signal to the built-in speaker 6.

Moreover, an In/Out (I/O) controller 73 is connected to the ISA bus 65. And this ISA-bus 65 receives the electric power supply from the external electric source connector 84 via the electric source supply charge control circuit 85 and supplies the electric power to each circuit when the power source switch is turned ON. Here, also the I/O controller 73 functions based on the system clock to be supplied from the clock generator 60.

Furthermore, the electric source supply charge control circuit 85 is controlled by the I/O controller 73 and controls the charging of the battery pack 86 connected to the battery connector 17 (FIG. 3).

This I/O controller 73 is comprised of a micro-controller, an I/O interface, the CPU, the ROM and the RAM and controls the input/out of data between the operating system and application software and various peripheral equipments such as the liquid crystal display 21 and the HDD 67 based on the Basic Input/Output System (BIOS) stored in the flush memory 79.

Furthermore, the I/O controller 73 is connected to the infrared port 45 and can conduct the infrared communications with the other computer device. Furthermore, the I/O controller 73 is connected to the reverse switch 77. And when the image pickup unit 22 of the CCD camera 23 is turned 180° in the rear direction of the liquid crystal display 21, the reverse switch 77 is turned ON and this fact is informed to the CPU 50 via the PCI-ISA bridge 66 and the host-PCI bridge 54.

Furthermore, the I/O controller 73 is connected to the full-push/half-push switch 78. And when the shutter button 7 provided on the upper surface of the main unit 2 is put ON the half-push condition, the full-push/half-push switch 78 is turned ON and the I/O controller 73 informs this to the CPU 50. And when the shutter button 7 is put ON the full-push condition, the full-push/half-push switch 78 is turned ON and this is informed to the CPU 50.

More specifically, when the shutter button 7 is half-pushed by the user while the capture software is risen on the RAM 53 from the hard disc of the HDD 67, the CPU 50 enters the still picture mode, and controlling the CCD camera 23, freezes the still picture. While the shutter button 7 is full-pushed, the CPU 50 captures the still picture data frozen and outputs this to the video controller 56.

On the other hand, when the shutter button 7 is full-pushed by the user while the capture software is not risen, the CPU 50 enters to the moving picture mode and captures the moving picture up to 60 seconds at the maximum and outputs this to the video controller 56.

In the ROM of the I/O controller 73, the wakeup program, the key input monitor program, LED control program and jog dial condition monitor program, and various other control programs are stored.

At this point, the jog dial condition monitor program is the program pertaining to the jog dial utility program stored in the hard disc of the HDD 67. And this is the program for monitoring whether or not the rotating encoder unit 202 of the jog dial 30 is rotation operated or push operated.

The wakeup program is the program to be controlled by the CPU 50 so that it conducts the predetermined processing when the current time to be supplied from the RTC circuit in the PCI-ISA bridge becomes the start time set in advance. And the key input monitor program is the program to monitor inputs from the operation key 4 and various other key switches.

The LED control program is the program to control the light-up of various lamps formed of Light Emitting Diode (LED) such as the electric power source lamp PL, the battery lamp BL, the message lamp ML.

Furthermore, the RAM of the I/O controller 73 is provided with the set time register for wakeup program, the key input monitor register for key input monitor program, the LED control register for LED control program and the I/O register for jog dial condition monitor program, and registers for various other programs.

The set time register stores the time information of start time set optionally by the user in order to use in the wakeup program. Thus, the I/O controller 73 judges whether the current time supplied from the RTC circuit becomes the optionally set start time or not based on the wakeup program, and when the current time becomes the start time, the I/O controller 73 informs this to the CPU 50. Thus, the CPU 50 rises the predetermined application software set in advance when the start time arrives, and executes the predetermined processing according to the application software.

The key input monitor register stores operation key flags based on inputs of the operation key 4, the stick 5, the left click button 5A, right click button 5B and the center button 5C.

Accordingly, the I/O controller 73 judges whether the pointing operation by the stick 5 and the click operations of the left click button 5A, the right click button 5B and the center button 5C are conducted or not based on the key input monitor program according to the condition of operation key flag, and when the pointing operation and the click operation are conducted, the I/O controller 73 informs this to the CPU 50.

Here, the pointing operation is the operation to move the mouse cursor to the desired position by pushing the stick 5 up and down and right and left by the finger. And the click operation is the operation to push the left click button 5A or the right click button 5B rapidly by the finger and rapidly release the finger.

With this arrangement, the CPU 50 executes the predetermined processing corresponding to the movement of a mouse cursor by the pointing operation and the click operation.

The LED control register stores the light-up flag showing the light-up condition of various lamps formed of LED such as the electric power source lamp PL, the battery lamp BL and the message lamp ML.

Accordingly, when the CPU 50 reads out the electronic mail from the hard disc of the HDD 67 and rises it on the RAM 53 by the push operation of the jog dial 30, and receives the electronic mail according to the electronic mail program, the I/O controller 73, storing the lightup flag, lights up the message lamp ML by controlling the LED 81 based on the lightup flag.

The I/O register for jog dial condition monitor program stores the rotation operation flag and the push operation flag in response to the rotation operation and the push operation conducted to the jog dial 30.

Accordingly, when the user desired menu item is selected from multiple menu items by the rotation operation and the push operation of the jog dial 30 connected via the rotation detection unit 88, the I/O controller 73, stores the rotation operation flag and the push operation flag to the I/O register and informs this to the CPU 50.

Thus, the CPU 50 rises the application software pertaining to the menu item determined by the rotation operation and the push operation of the jog dial 30 according to the jog dial utility program read out from the HDD 67 and in operation on the RAM 53 and executes the predetermined processing.

At this point, the I/O controller 73 is constantly being operated based on the jog dial condition monitor program by the control of the power source supply charge control circuit 85 even when the power source switch 40 is OFF and the operating system is not started. Thus, the user desired application software and the script file can be started even in the power saving condition or when the power source is OFF not providing the key for exclusive use.

The I/O controller 73 is connected to the I$^2$C bus 82, and by supplying various setting parameters to the CCD camera 23 set by the operation key 4 and the job dial 30 via the I$^2$C bus 82, can control on/off of the camera power source in the CCD camera 23 and can adjust the brightness and contrast in the CCD camera 23.

Next, the function of the I/O controller 73 based on the jog dial condition monitor program will be explained referring to FIG. 13 to FIG. 15 in the following paragraphs.

Figure 13:
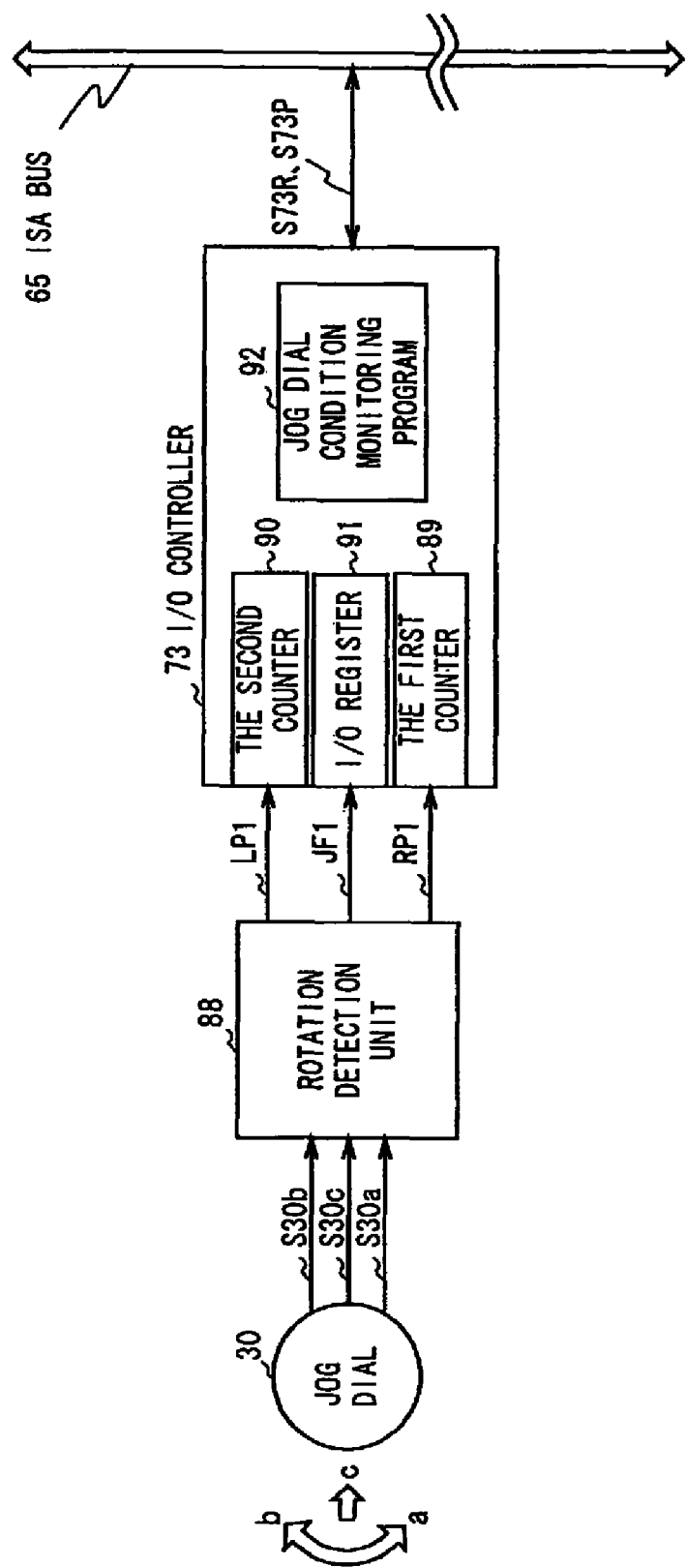
FIG. 13 is a block diagram illustrating the detection of the jog dial rotating direction.
Figure 14:
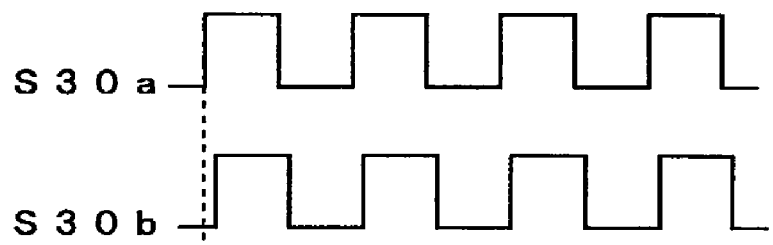
FIG. 14 is a pulse waveform diagram illustrating the detection of rotating direction by the rotation detection unit.
Figure 14:
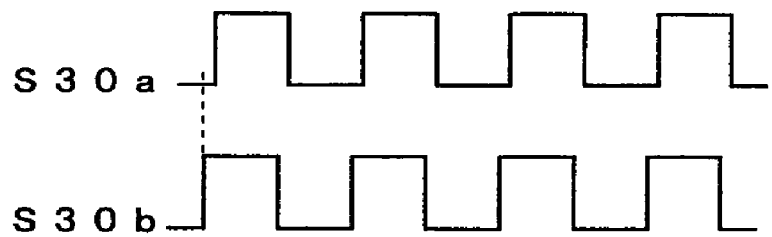

As shown in FIG. 13, when the jog dial 30 is rotation operated either in the arrow a direction or in the arrow b direction (FIG. 4), as shown in FIG. 14, the jog dial 30 outputs rotation operation signal S30a or S30b corresponding respectively to the right turn (arrow a direction) or left turn (arrow b direction) to the rotation detection unit 88, and when the jog dial is push operated, it outputs a push operation signal S30c to the rotation detection unit 88.

The rotation detection unit 88 detects whether the direction of rotation of the jog dial 30 is the right direction (the arrow a direction) or the left direction (the arrow b direction) based on the shift of start timing of the rotation operation signals S30a and S30b, and also detects that the jog dial 30 is push operated based on the push operation signal S30c.

Then, when the rotation detection unit 88 detects that the rotating direction of the jog dial 30 is the right turn, it supplies a right turn pulse RP1 to the first counter 89 of the I/O controller 73. While the rotation detection unit 88 detects that the rotating direction is the left turn, it supplies a left turn pulse LP1 to the second counter 90 of the I/O controller 73.

Furthermore, when the rotation detection unit 88 detects that the jog dial 30 is push operated based on the push operation signal S30c, it stores a push operation flag JF1 into the I/O register 91.

The CPU of the I/O controller 73 detects the quantity of rotation change of the jog dial 30 based on the difference between the count value of the right turn pulse RP1 by the first counter 89 and the count value of the left turn pulse LP1 by the second counter 90 by the polling per 5 ms according to the jog dial condition monitor program 92 stored in the ROM. And simultaneously, it detects whether the rotary encoder unit 202 is push operated in the direction of an arrow c or not.

Figure 15:
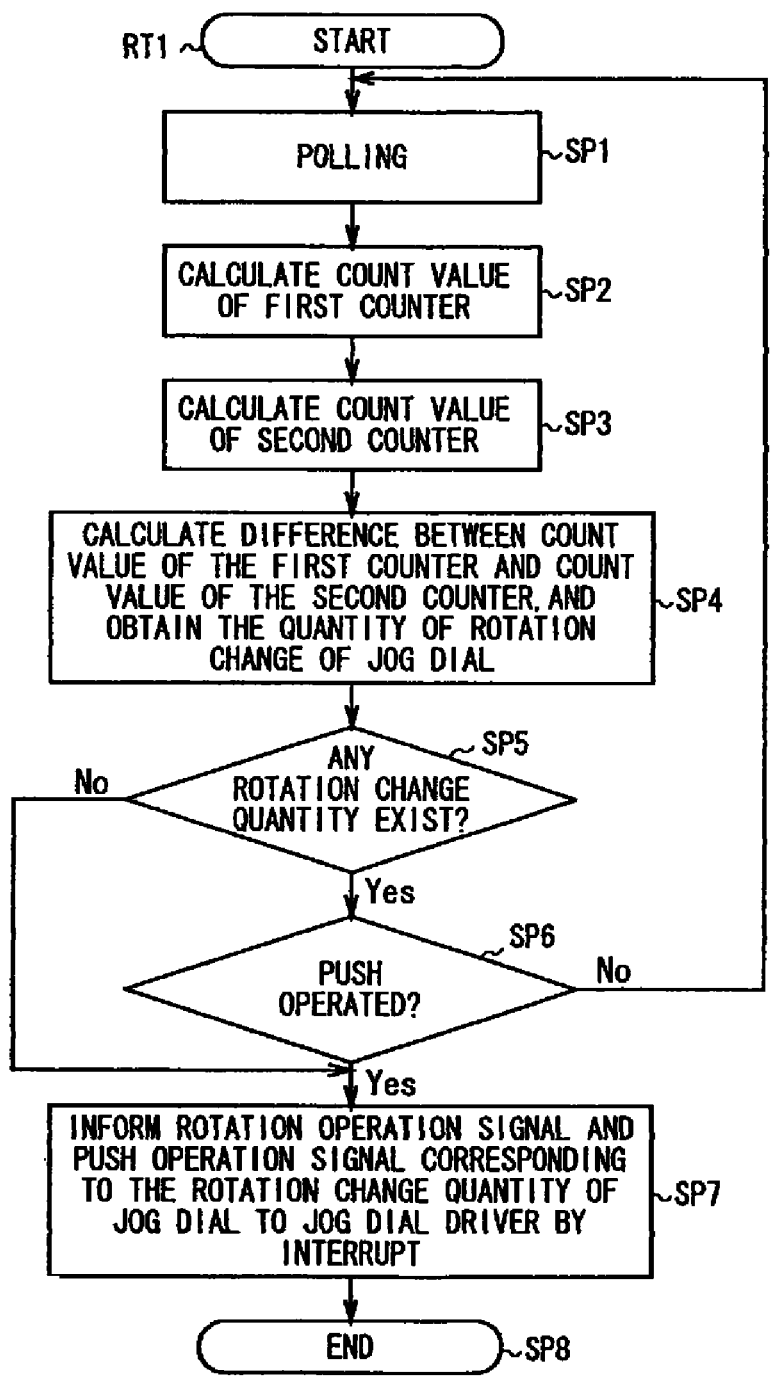
FIG. 15 is a flow chart showing the processing procedure of an I/O controller to be conducted according to the jog dial condition monitor program.

More specifically, as shown in FIG. 15, the CPU of the I/O controller 73, entering from the starting step of the routine RT1, moves to the step SP1. At the step SP1, the CPU conducts the polling of the first counter 89, the second counter 90 and the I/O register 91 per 5 ms according to the jog dial condition monitor program 92, and moves to the following step SP2.

At the step SP2, the CPU counts the count value of the first counter 89 by subtracting the count result of the first counter 89 at the time (T−1) from the count result of the first counter 89 at the current time (T), and moves to the following step SP3.

At the step SP3, the CPU calculates the count value of the second counter 90 by subtracting the count result of the second counter 90 at the time (T−1) from the count result of the second counter 90 at the current time (T) and moves to the following step SP4.

At the step SP4, the CPU obtains the quantity of rotation change of the jog dial 30 by calculating the differential between the count value of the first counter 89 and the count value of the second counter 90 and moves to the following step SP5.

At the step SP5, the CPU judges whether the quantity of rotation change occurs in the jog dial 30 or not. And at this point, if a negative result is obtained, this shows that no rotation change occurs to the jog dial 30, and at this moment the CPU moves to the step SP7.

On the other hand, if an affirmative result is obtained at the step SP5, this shows that the rotation change has been given to the jog dial 30, and at this moment the CPU moves to the following step SP6.

At the step SP6, the CPU judges whether the jog dial 30 is push operated in the direction of an arrow c or not based on the push operation flag JF1 to be stored in the I/O register 91. If a negative result is obtained at this time, this means that the push operation has not been conducted to the job dial 30, and at this moment, the CPU returns to SP1 and repeats processings described above.

On the other hand, if an affirmative result is obtained at the step SP6, this shows that push operation has been conducted to the jog dial 30, and at this moment, the CPU moves to the following step SP7.

Since the rotation change is given and the push operation is conducted to the jog dial 30, at the step SP7, the CPU generates a rotation change signal S73R corresponding to the amount of rotation change of the jog dial 30 and a push change signal S73P and informs this to the CPU 50 by interrupt via the jog dial driver risen on the RAM 53 through the I/O register 91. And moving to the following step SP8, the CPU terminates the processing of I/O controller 73.

Figure 16:
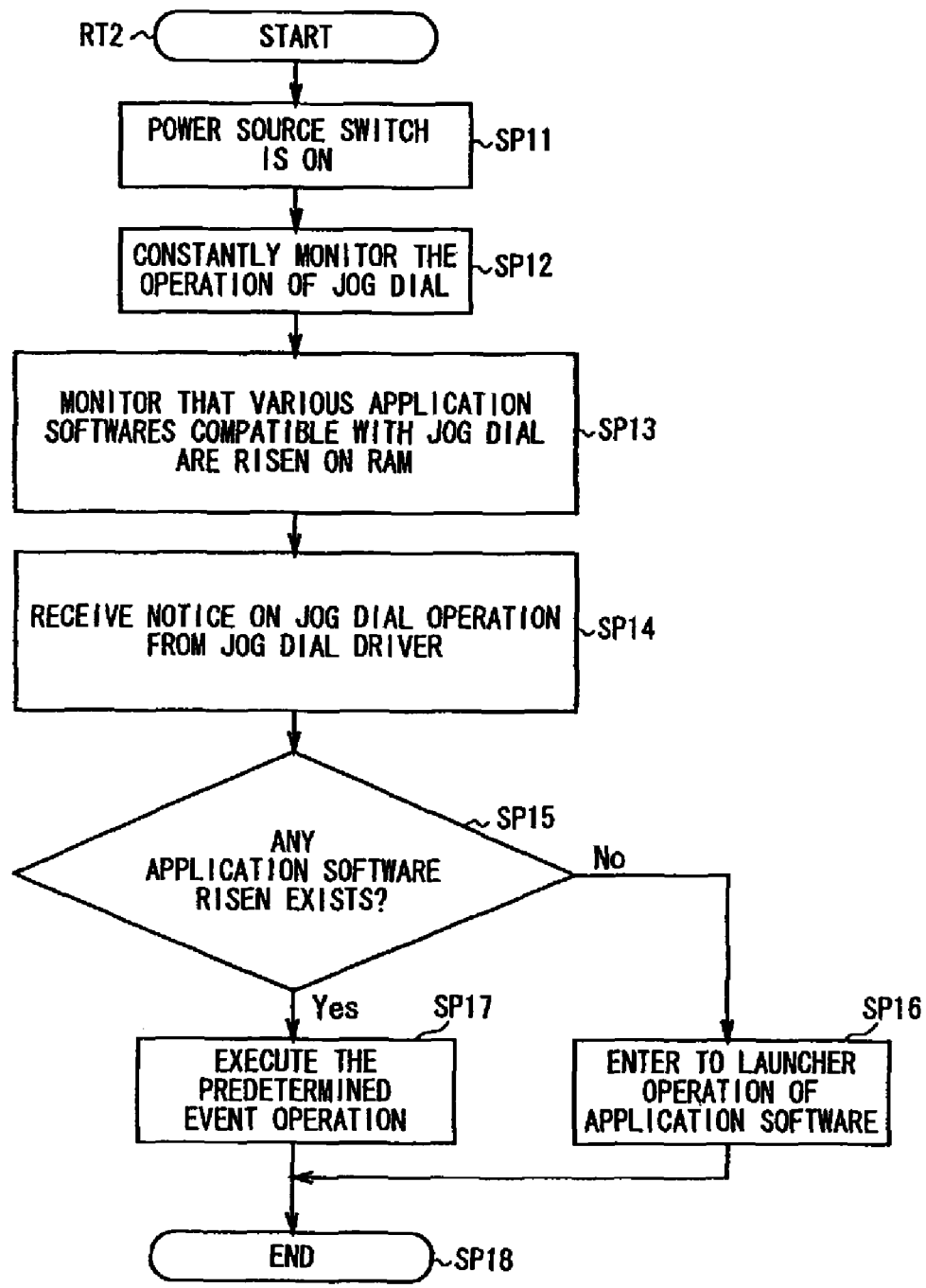
FIG. 16 is a flow chart showing the processing procedure according to the operation of jog dial at the time when the application software is started and not started.

Then, the processing procedure to be conducted by the CPU 50 according to the jog dial utility program risen on the RAM 53 from the HDD 67 will be described referring to FIG. 16 as follows.

Firstly, the CPU 50, entering from the start step of the routine RT2, moves to the step SP11. At the step SP11, upon receiving a notice that the power source switch 40 is turned ON by the user through the I/O controller 73, the CPU 50 moves to the following step SP12.

At the step SP12, the CPU 50, upon receiving the notice informing that the jog dial 30 is operated by the user from the I/O controller 73 via the jog dial driver, recognizes the operating condition of the jog dial 30 and moves to the following step SP13.

At the step SP13, the CPU 50 monitors that various application softwares that can be controlled by the jog dial 30 are risen on the RAM 53 and moves to the following step SP14.

At the step SP14, the CPU 50 receives a notice on the operating condition of the jog dial 30 from the jog dial driver risen on the RAM 53, and moves to the following step SP15.

At the step SP15, the CPU 50 judges whether there exist various application softwares risen on the RAM 53 or not. And if a negative result is obtained, this means that no application software in operation exists, and at this moment the CPU 50 moves to the following step SP16.

At the step SP16, the CPU 50, entering the launcher operation of various applications softwares not risen, moves to the following step SP18 and terminates the processing.

Here, the launcher operation functions on condition that no application software in operation exists. And the CPU 50, by executing the launcher operation based on the push operation of the jog dial 30, displays the jog dial menu corresponding to the multiple application softwares registered in the launcher list in advance on the liquid crystal display 21.

For example, if no application software in operation exists, and the jog dial 30 is push operated in the arrow c direction, the I/O controller 73 notifies the rotation change signal S73R showing the operating condition of the jog dial 30 and the push change signal S73P to the CPU 50 via the jog dial driver.

Figure 17:
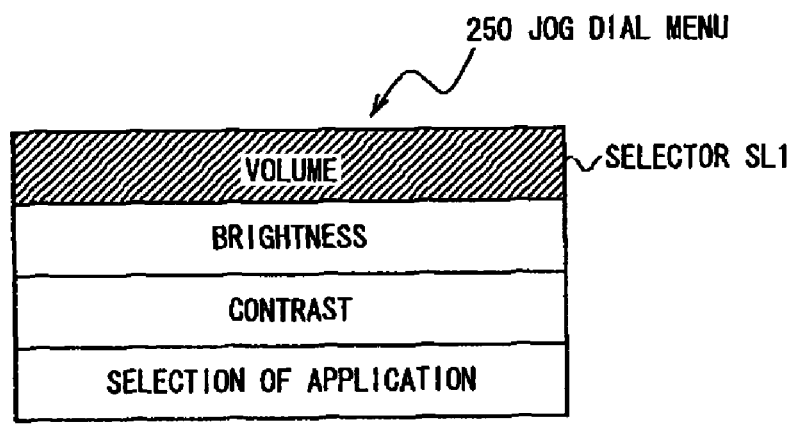
FIG. 17 is a brief linear diagram showing the jog dial menu.

Thus, the CPU 50 rises application selection program for conducting the volume adjustment of the built-in speaker 6 registered in the launcher list in advance, the brightness adjustment and the contrast adjustment of the liquid crystal display 21, and the selection of the application software, and displays jog dial menu 250 as shown in FIG. 17 on the liquid crystal display 21.

In this jog dial menu 250, the menu items "volume", "brightness", "contrast" and "application selection" corresponding to the processings such as the volume adjustment, the brightness adjustment, the contrast adjustment and the selection of application software respectively are displayed.

At this point, the high-lighted display area (diagonally shaded area) by the reverse display is the selector SL1 currently being selected, and as the default, the selector SL1 is displayed locating on the menu item "volume".

Next, when the user rotates the jog dial 30 in the direction of arrow a or b for the purpose of moving the selector SL1, the I/O controller 73 informs the detected rotation change signal S73R of the job dial 30 according to the jog dial condition monitor program 92 to the CPU 50 via the jog dial driver in operation on the RAM 53.

Figure 18:
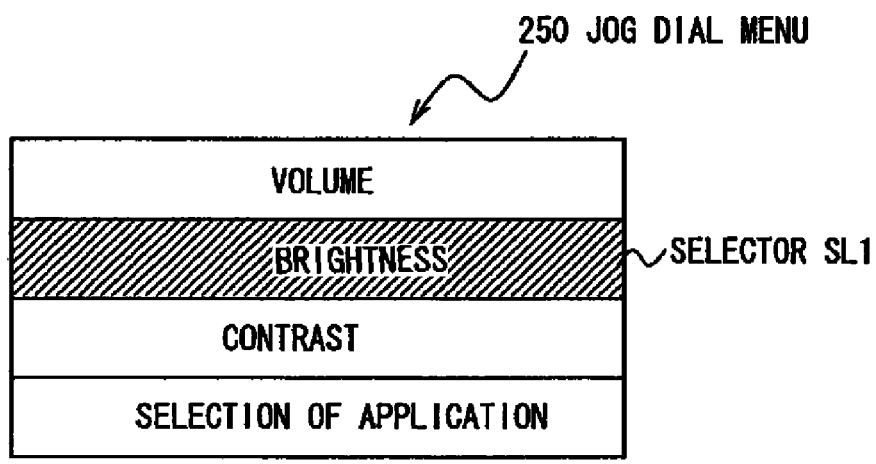
FIG. 18 is a brief linear diagram illustrating the movement of selector (1)

With this arrangement, the CPU 50 moves the selector SL1 onto the user desired menu item based on the rotation change signal S73R: For example, in the jog dial menu 250, if the selector SL1 placed on the default menu item "volume" is turned by the desired angle in the arrow b direction by the user, the selector SL1 moves onto the menu item "brightness" as shown in FIG. 18.

Figure 19:
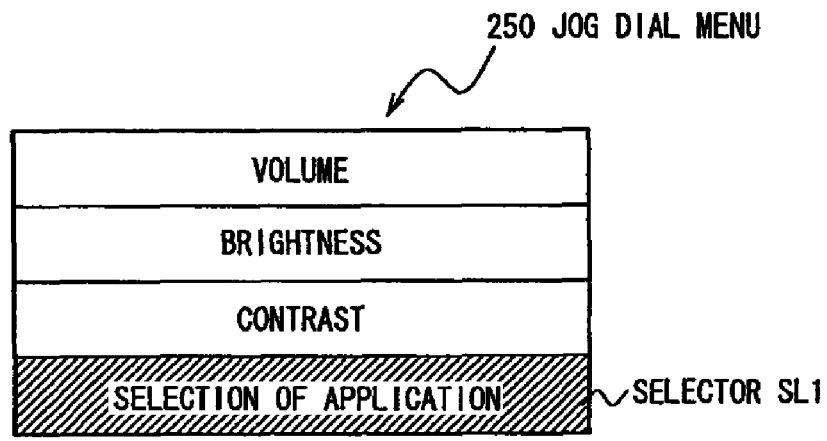
FIG. 19 is a brief linear diagram illustrating the movement of selector (2)

Then, when the jog dial 30 is turned by the desired angle in the arrow b direction by the user, the selector SL1 moves onto the menu item "application selection" as shown in FIG. 19.

Figure 20:
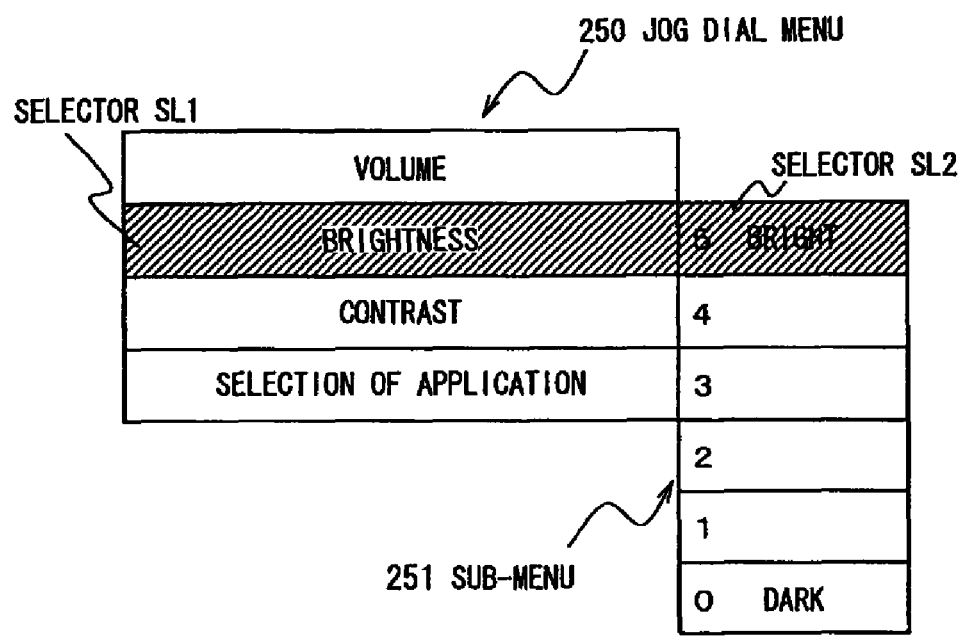
FIG. 20 is a brief linear diagram showing the sub-menu with regard to "Brightness" corresponding to the push operation of jog dial.

Thus, the CPU 50, after moving the selector SL1 onto the user desired menu item, such as "brightness" corresponding to the rotation operation of the jog dial 30 by the user, if the push operation in the arrow c direction is conducted to the jog dial 30 by the user, displays the sub-menu 251 corresponding to the menu item "brightness" as shown in FIG. 20.

On this sub-menu 251, 6 stages of sub menu items from the sub-menu item "5" to be selected when setting the brightness the brightest to the sub-menu item "0" to be selected when setting the brightness the darkest. And the selector SL2 is displayed under the condition positioned on the sub-menu item "5" as the default.

Then, when the user operates the jog dial 30 in the arrow b direction for the purpose of moving the selector SL2, the I/O Controller 73 informs the rotation change signal S73R showing the operating condition of the jog dial 30 according to the jog dial condition monitor program 92 to the CPU 50 via the jog dial driver in operation on the RAM 53.

With this arrangement, the CPU 50 transfers the selector SL2 onto any one of the user desired menu items "5" to "0" based on the rotation change signal S73R. In this connection, the CPU 50 is currently in the middle of displaying the sub-menu 51, it does not transfer the selector SL1 of the jog dial menu 250 by operating the jog dial 30.

Figure 21:
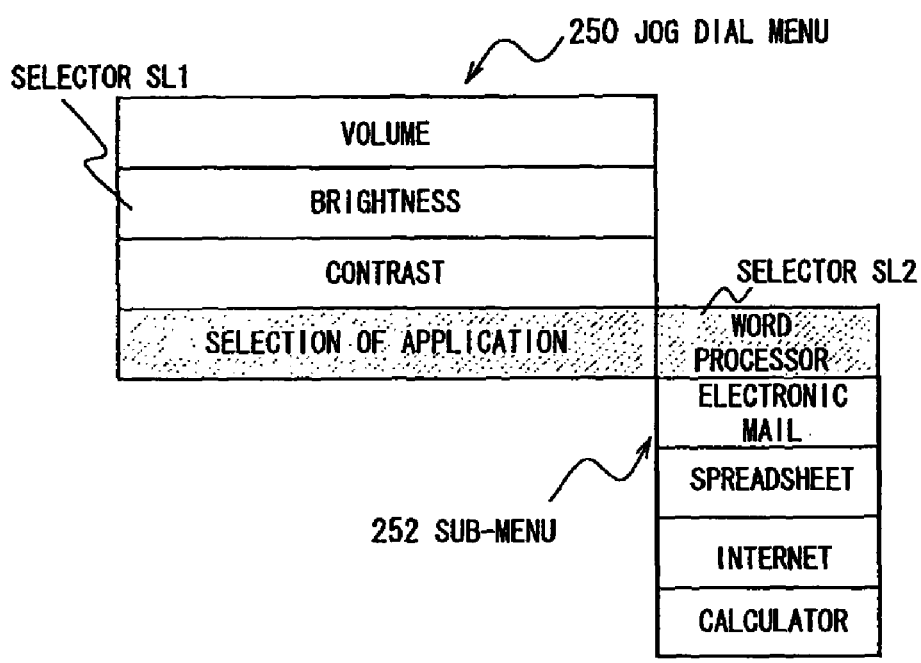
FIG. 21 is a brief linear diagram showing the sub-menu with regard to "Selection of application" corresponding to the push operation of jog dial.

When the jog dial 30 is push operated by the user under the condition in which the selector SL1 of the jog dial menu 250 is moved onto the menu item "application selection" according to the push operation of the jog dial 30 by the user, the CPU 50 displays the sub-menu 252 corresponding to the menu item "application selection" as shown in FIG. 21.

In this case, the sub-menu item "word-processor" to be selected when starting the word processor application, the sub-menu item "electronic mail" to be selected when starting the electronic mail program, the sub-menu item "spreadsheet" to be selected when starting the spreadsheet program, the sub-menu item "Internet" to be selected when starting the Internet program, and the sub-menu item "electronic calculator" to be selected when starting the electronic desk calculator are displayed on the sub-menu 252. However, as the menu item of sub-menu 252 corresponding to the menu item "application selection", various menu items other than these can be set.

In practice, in the sub-menu 251 corresponding to the menu item "brightness" shown in FIG. 20; when the sub-menu item "3" is selected according to the rotation operation and the push operation of the jog dial 30, the CPU 50 sets the liquid crystal display 21 to the brightness level corresponding to the sub-menu item "3".

Furthermore, in the sub-menu 252 corresponding to the menu item "application selection" shown in FIG. 21, in the case where the sub-menu item "word-processor" is selected corresponding to the rotation operation and the push operation of the jog dial 30, the CPU 50 starts the word-processor application corresponding to the sub-menu item "word-processor".

On the other hand, if an affirmative result is obtained at the step SP15 (FIG. 16), this shows that there exists an application software in operation, and at this moment the CPU 50 moves to the following step SP17.

At the step SP17, the CPU 50 executes the predetermined event operation according to the application software in operation and moves to the following step SP18 and terminates the processing.

At this point, the case of executing the predetermined event operation according to various application softwares in operation will be explained in the paragraphs that follow. As the application software in operation, it is the prerequisite to compatible with the jog dial 30. And more specifically it is equipped with the image display function.

Figure 22:
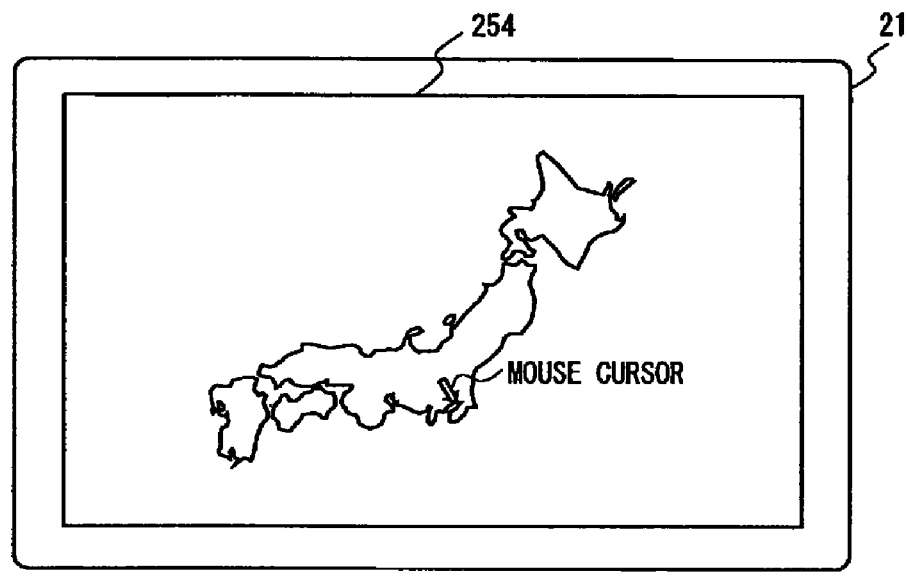
FIG. 22 is a brief linear diagram showing the map screen.
Figure 23:
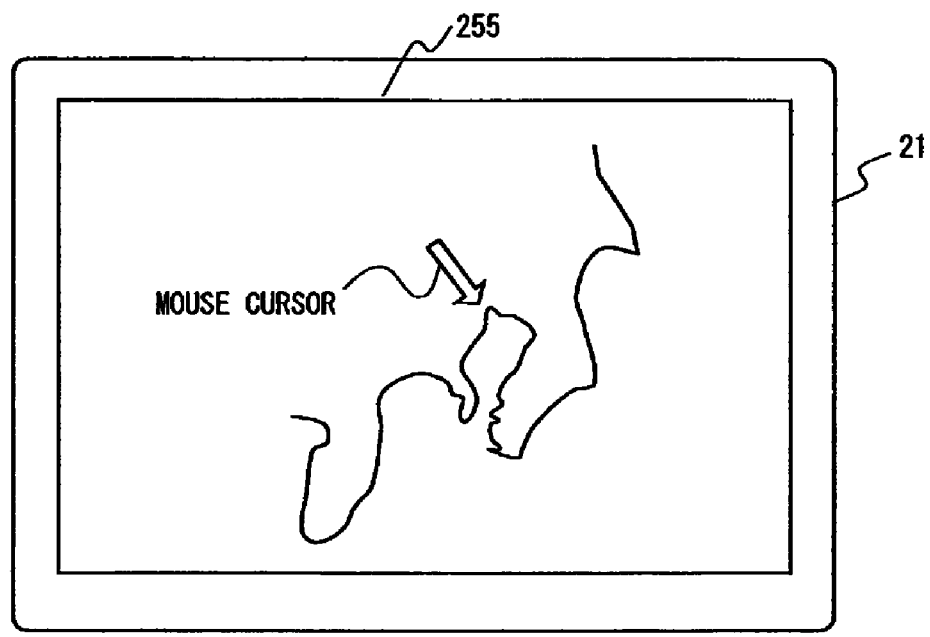
FIG. 23 is a brief linear diagram showing the enlarged display corresponding to the rotation operation of jog dial.

For example, in the case where a map screen 254 of the map of Japan as shown in FIG. 22 is displayed on the liquid crystal display 21 by the predetermined map display application software, if the rotation operation in the arrow a direction is conducted to the jog dial 30 in a state in which the mouse cursor is put on the desired position (Tokyo area) by the user's pointing operation of the stick 5, the CPU 50 enlarges the map screen 254 according to the rotation operation and forming the enlarged map screen 255 as shown in FIG. 23, displays this on the liquid crystal display 21.

Furthermore, if the rotation operation in the arrow b direction is conducted to the jog dial 30, the CPU 50 scales down the map screen 254 corresponding to the rotation operation, and forming the reduced map screen (not shown in FIG.), displays this on the liquid crystal display 21.

Accordingly, in the case where the map display application software having the image display function corresponding to the jog dial 30 is started, if the rotation operation is conducted to the jog dial 30, the CPU 50 enlarges or reduces the map screen 254 displayed on the liquid crystal display 21 corresponding to the rotation operation of the jog dial 30.

Next, the case of executing the predetermined event operation according to the animated picture editing feature corresponding to the jog dial 30 will be explained in the paragraphs that follow.

Figure 24:
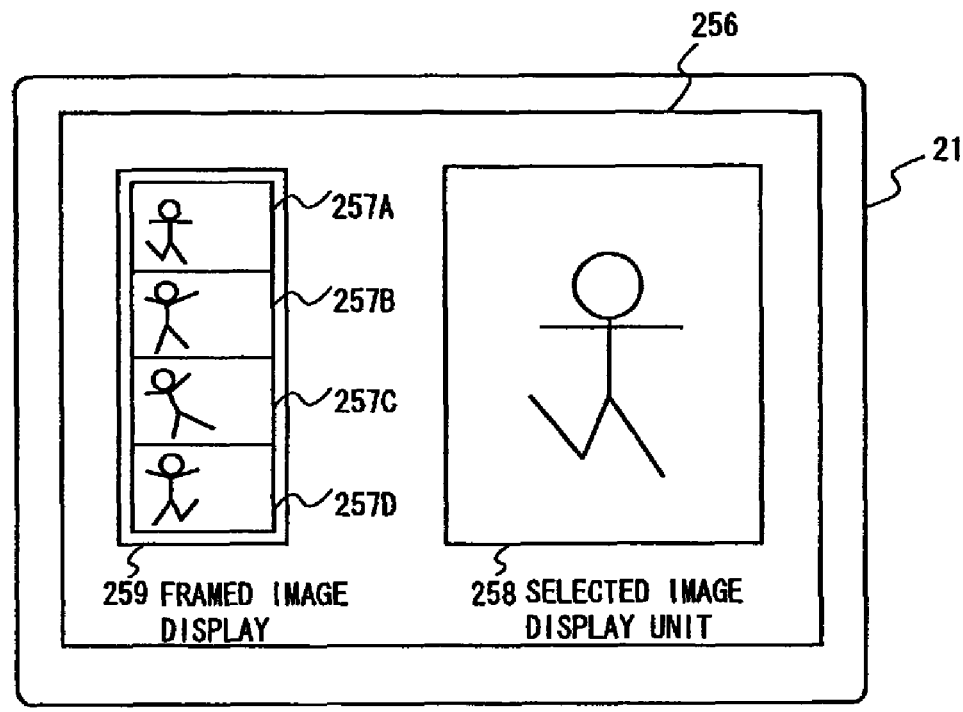
FIG. 24 is a brief linear diagram showing an editing screen.

In this case, the editing screen 256 as shown in FIG. 24 is displayed on the liquid crystal display 21 by the animated picture editing application software. This editing screen 256 consists of framed picture display unit 259 for displaying continuing 4 framed pictures S257A to S257D from among multiple framed pictures forming animated picture, and the selected picture display unit 258 for displaying any one of framed pictures S257A to S257D selected by sending the frame forward or backward frames according to the rotation operation of the jog dial 30.

Thus, when the rotation operation in the arrow a and b directions is conducted under the condition in which the editing screen 256 is displayed on the liquid crystal display 21, the CPU 50 displays such as the frame picture S257A selected by the rotation operation from among frame pictures S257A to S257D of the framed picture display unit 259. Thus, the user becomes possible to apply the desired image, editing processing to the framed picture S257A displayed on the selected image display unit 258

Figure 25:
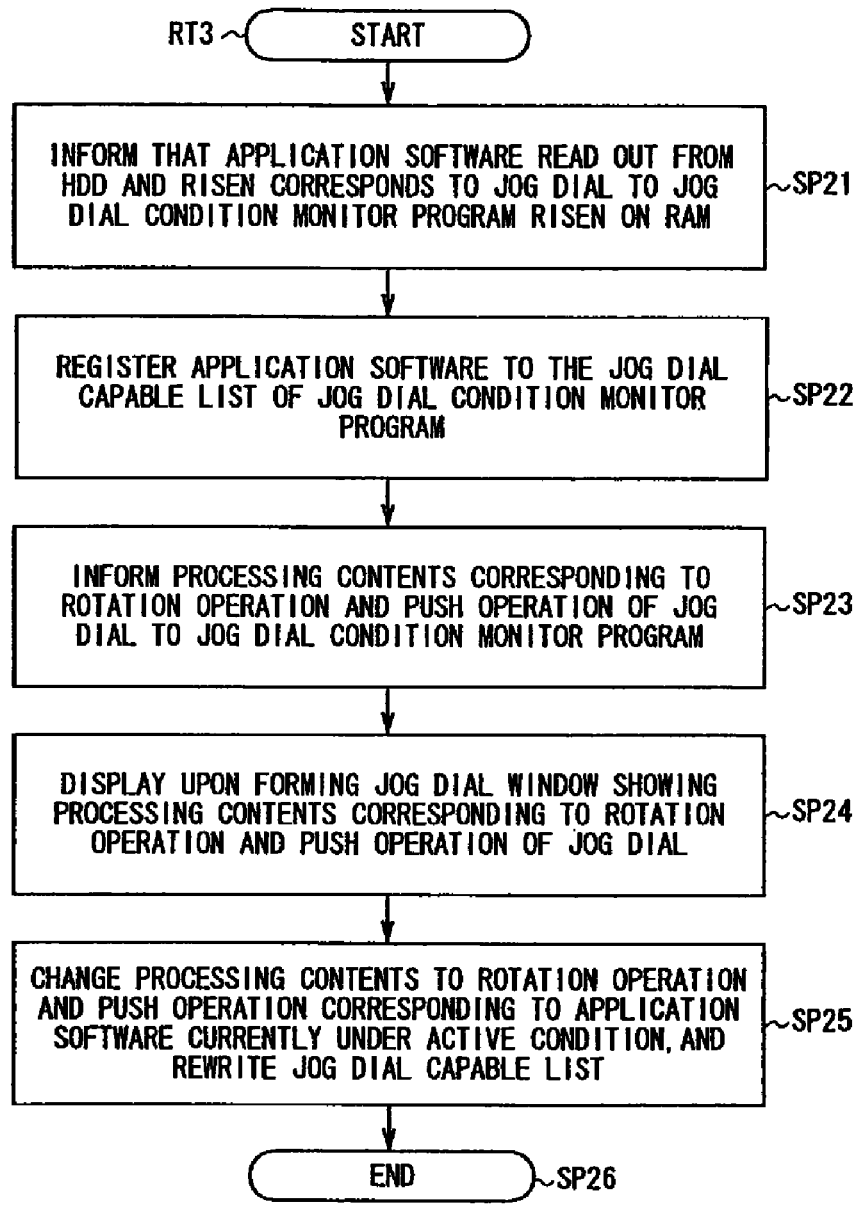
FIG. 25 is a flow chart shoring the allocation procedure of the processing according to the operation of jog dial.

In this connection, it is necessary for the CPU 50 to allocate the predetermined processing according to the rotation operation and the push operation of the jog dial 30. And the allocation procedure of the processing according to the operation of this jog dial 30 will be explained referring to a flow chart of FIG. 25 as follows.

In this case, the CPU 50, entering from the starting step of the routine RT3, moves to the step SP21. At the step SP 21, the CPU 50 informs that the application software read out from the hard disc of the HDD 67 and started on the RAM 53 corresponds to the jog dial 30, and moves to the following step SP22.

At the step SP22, the CPU 50 registers the application software corresponding to the jog dial 30 under operating condition onto the list corresponding to the jog dial of the jog dial utility program in the RAM 53 and moves to the following step SP23.

At the step SP23, the CPU 50 writes the processing contents corresponding to the rotation operation and the push operation of the jog dial 30 to the application software registered on the jog dial capable list into the jog dial utility program on the RAM 53, and moves to the following step SP24.

Figure 26:
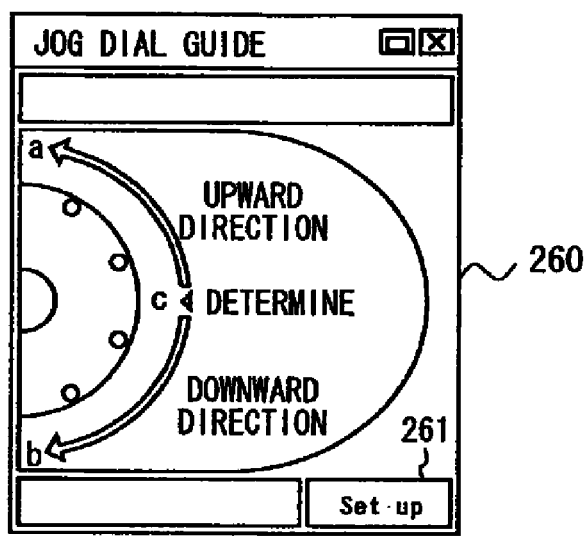
FIG. 26 is a brief linear diagram showing a jog dial window.

At the step SP24, the CPU 50 forms the jog dial window 260 showing the processing contents corresponding to the rotation operation and the push operation of the jog dial 30 as shown in FIG. 26, and displays this on the liquid crystal display 21 and moves to the following step SP25.

In this case, the jog dial window 260 is provided for guiding what kind of processing will be conducted when the jog dial 30 is operated. And "upward" showing that the selector SL moves to the upper part of the menu item when it is rotation operated in the arrow a direction, "downward" showing that the selector SL moves to the lower part of the menu item when rotation operated in the arrow b direction, and "determine" showing that the menu item shown by the selector SL is to be determined when push operated in the arrow c direction will be displayed.

At the step SP25, when the active application software is changed by the user, the CPU 50 changes the processing contents to the rotation operation and push operation corresponding to the window screen of the application software changed, and after rewriting the jog dial capable list, forming a new jog dial window 260, displays this, and moving to the following step SP26, stops the processing.

(2) Setting of Menu Item Using Jog Dial

Next, in the notebook PC 1 attached with jog dial, the process of the picture quality setting and the mode setting when photographing the subject by the CCD camera 23 of the image pickup unit 22 are all conducted by the jog dial 30 will be described.

Figure 27:
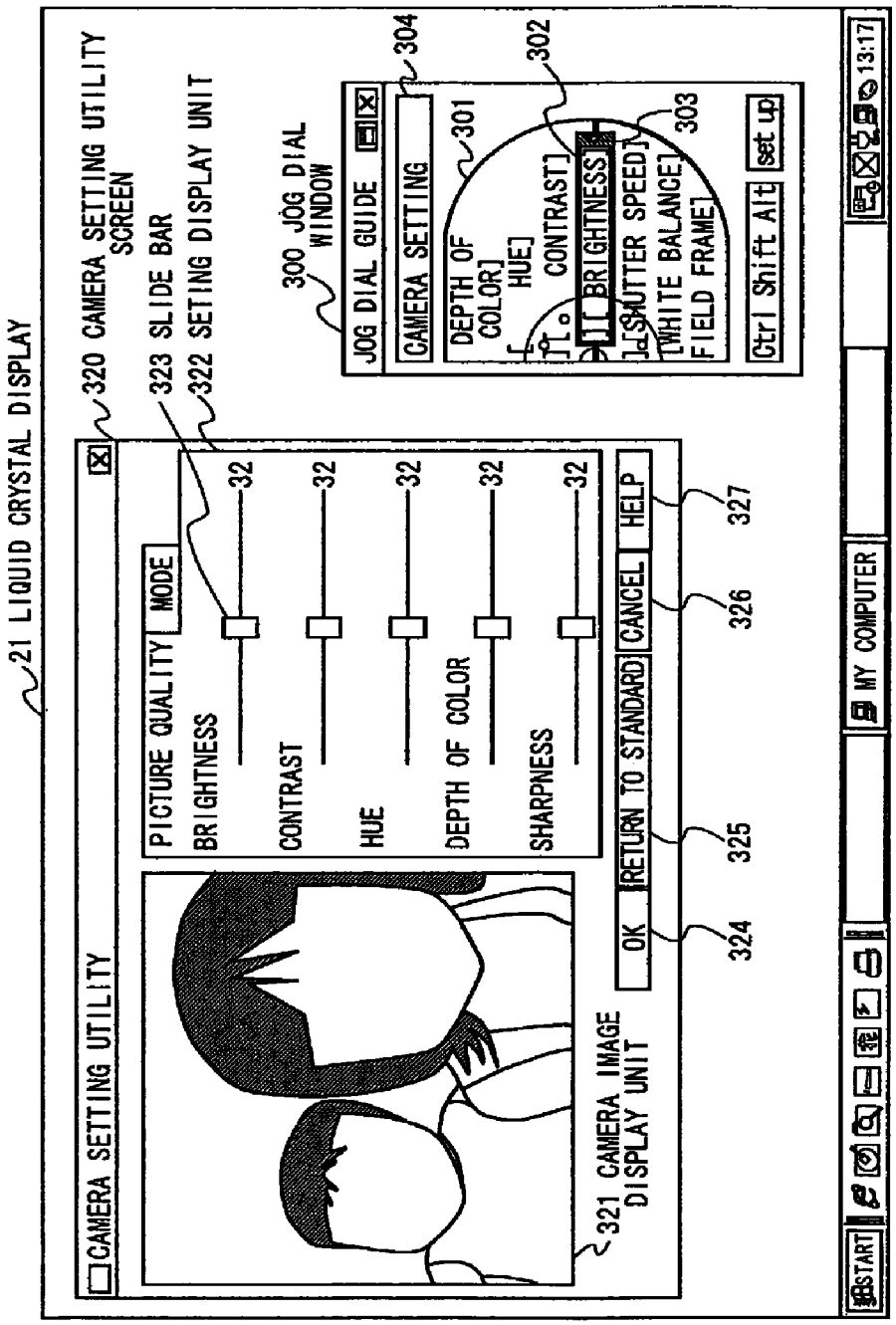
FIG. 27 is a brief linear diagram showing the camera setting utility screen and the jog dial window of selection mode.

The CPU 50 of the notebook PC 1 attached with jog dial, upon receiving a command from the user, displays a camera setting utility screen 320 and a jog dial window 300 interlocked with the camera setting utility screen 320 on the liquid crystal display 21 based on the jog dial utility program as shown in FIG. 27.

In this camera setting utility screen 320, the picture quality setting and the mode setting are to be executed by the user operating the jog dial 30. And the CCD camera 23 is equipped with a camera image display unit 321 for displaying camera image being photographed and a setting display unit 322 for executing the picture quality setting and the mode setting.

The setting display unit 322 shifts displays between the picture quality setting time and the mode setting time. And at the time of picture quality setting, multiple menu items for setting the quality of picture, i.e., "Brightness", "Contrast", "Hue", "Depth of color" and "Sharpness" are displayed and adjustable slide bar 323 is provided in 32 stages per each menu item.

Furthermore, in the camera setting utility screen 320, an "OK" button 324 to determine the setting value adjusted by the slide bar 323 of each menu item, a "Return to standard" button 325 for returning to the default condition, a "Cancel" button 326 to cancel all setting values adjusted and a "Help" button 327 are provided on the lower part of the setting display unit 322.

On the other hand, on the jog dial window 300 of selection mode associated with the camera setting utility screen 320, the title of "Camera setting" is displayed on the title display unit 304, and simultaneously, the same menu items as the setting display unit 322 at the picture quality setting time, i.e., ("Depth of color", "Hue", "Contrast", "Brightness"), and the menu items at the mode setting time, i.e., ("Shutter speed", "White balance", . . . ) are displayed successively in ring shape.

In this connection, menu items of the item display unit 301 will be successively moved corresponding to the rotation operation of the jog dial 30. And all menu items at the picture quality setting time and the mode setting time will be successively displayed in ring shape only by one directional rotation operation Furthermore, in the jog dial window 300 of the selection mode, a recognition frame 302 for recognizing the menu item transferred to the center of the item display unit 301 according to the rotation operation of the jog dial 30 by the user is provided.

For example, if the menu item "Brightness" at the picture quality setting time is placed in this recognition frame 302, the CPU 50 displays the push operation ICON 303 formed of a leftward delta mark urging the user to push operate the jog dial 30. And in response to the push operation of the jog dial 30 by the user, the slide bar 323 corresponding to the menu item "brightness" of the setting display unit 322 can be set to the adjustable condition.

Figure 28:
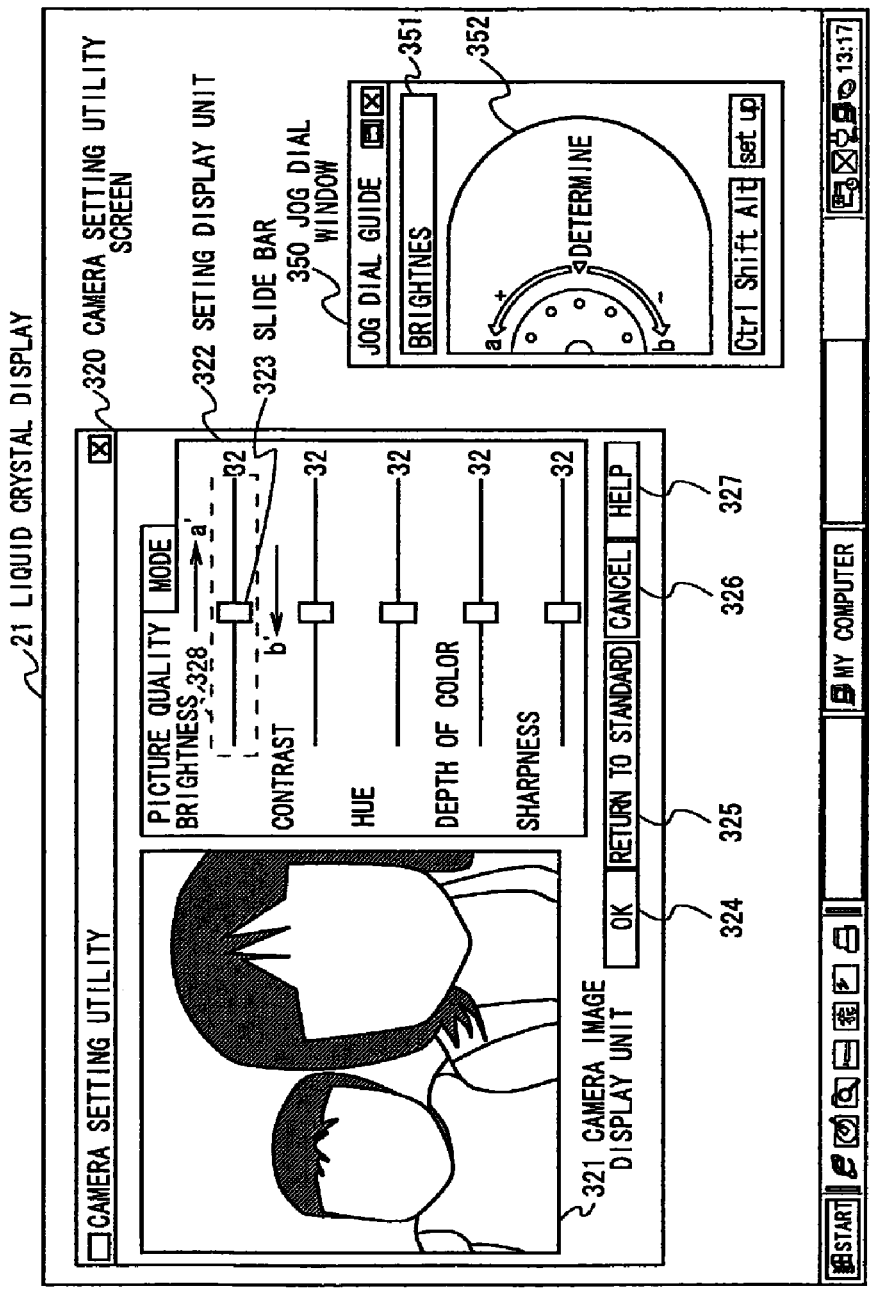
FIG. 28 is a brief linear diagram showing the jog dial window of setting mode at the time when setting the picture quality.

As shown in FIG. 28 in which parts corresponding to those in FIG. 27 are designated the same reference numerals, the CPU 50 shifts the display from the jog dial window 300 of the selection mode to the jog dial window 350 of the setting mode based on the jog dial utility program.

In this case, on the camera setting utility screen 320, the CPU 50, by displaying a frame 328 shown by broken line around the slide bar 323 corresponding to the menu item "Brightness" of the setting display unit 322, can make the user recognize the slide bar 323 of the present menu item "Brightness" can be adjusted by the jog dial 30.

Moreover, in the jog dial window 350 of the setting mode, the title of the menu item "Brightness" is displayed on the title display unit 351, and the processing contents corresponding to the rotation operation and the push operation of the jog dial 30 are displayed on the guide display unit 352.

In this case, according to the guide display unit 352 of the jog dial window 350 of the setting mode, it shows to the user that the user can adjust to the setting value corresponding to the stop position of the slide bar 323 by push operating the jog dial, by moving the slide bar 323 in the arrow a' direction, i.e., the rightward direction, according to the rotation operation of the jog dial 30 in the arrow a direction, and by moving the slide bar 323 in the arrow b' direction, i.e., the leftward direction, according to the rotation operation of the jog dial 30 in the arrow b direction.

Accordingly, when the jog dial 30 is rotation operated in the arrow a direction under the condition in which the menu item "Brightness" is selected, the CPU 50 moves the slide bar 323 in the arrow a' direction, i.e., rightward direction, and changing the brightness of the image to be displayed on the camera image display unit 321 to real time, makes the user recognize the adjusting condition of the setting value.

Then, when the jog dial 30 is push operated by the user, the CPU 50 determines the level of the menu item "Brightness" to the set value at the stop position of the slide bar 323.

Then, the CPU 50 returns the display to the jog dial window 300 of the selection mode (FIG. 27) from the jog dial window 350 of the setting mode and executes the setting of menu item to be selected next repeatedly as described above.

Figure 29:
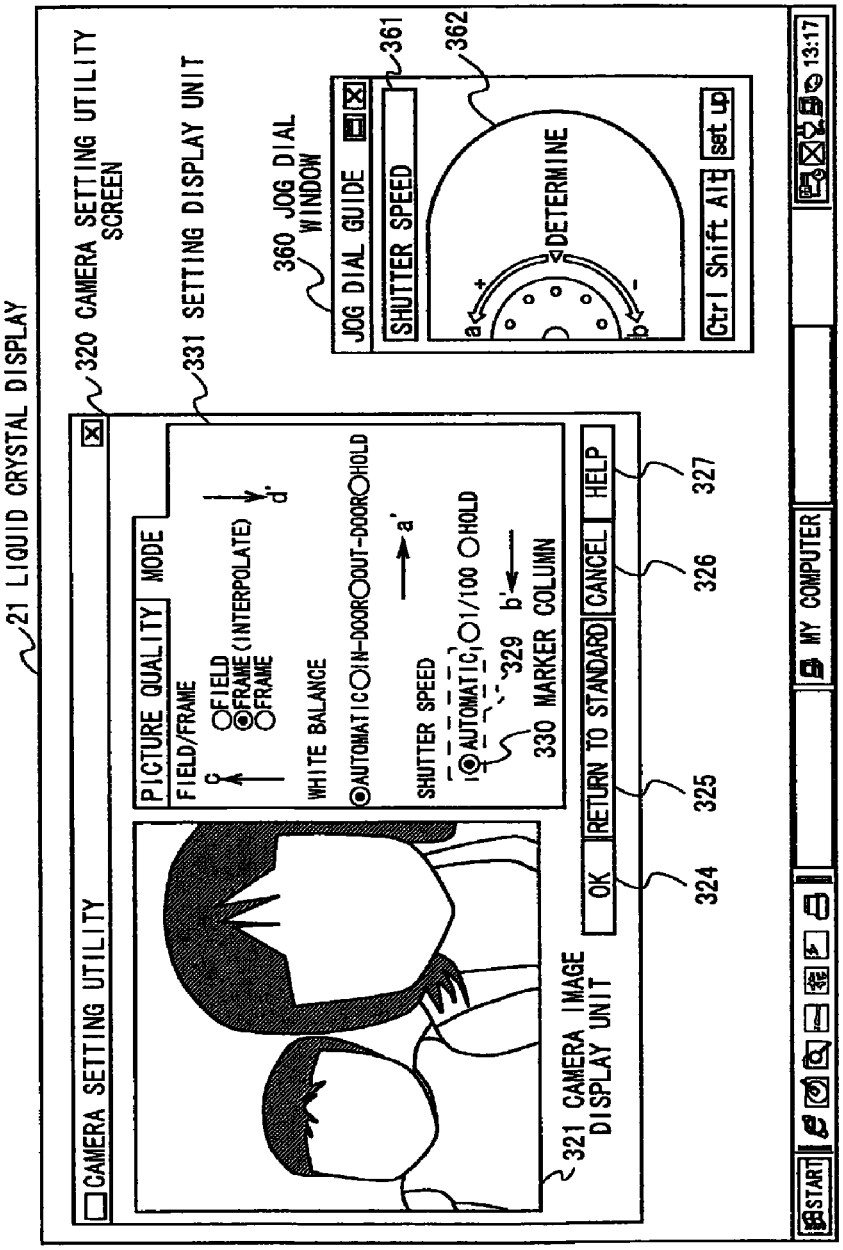
FIG. 29 is a brief linear diagram showing the jog dial window of setting mode at the time when setting the mode.

In the jog dial window 300 of the selection mode (FIG. 27), if such as "Shutter speed" is placed in the recognition frame 302 and selected from among menu items "Shutter speed", "White balance" and "Field/Frame" of the item display unit 301 corresponding to the rotation operation of the jog dial 30, the CPU 50 displays the setting display unit 331 to be used when setting the mode onto the camera setting utility screen 320 as shown in FIG. 29. And simultaneously, the CPU 50 displays the jog dial window 360 of the setting mode interlocked with the setting display unit 331.

Accordingly, when the menu item "Shutter speed" is selected by the rotation operation and the push operation of the jog dial 30, the CPU 50 can set the marker column of "Shutter speed" in the setting display unit 331 to the selectable condition.

At this point, the CPU 50, by displaying a frame 329 shown with broken lines around the marker column 300 of "Shutter speed", can make the user recognize that currently any of multiple marker columns 300 in "Shutter speed" can be selected by the jog dial 30.

In this connection, the jog dial window 360 is similar to that of the jog dial window 350 at the picture quality setting time. And the title of the menu item "Shutter speed" being selected currently is displayed on the title display unit 361 and at the same time, the processing contents corresponding to the rotation operation and push operation of the jog dial 30 is displayed on the guide display unit 362.

In this case, according to the guide display unit 362 of the jog dial window 360, the user would know that the marker display (•) of the marker column 300 is moved in the arrow a' direction, i.e., the rightward or upward, with the frame 329 by the rotation operation of the jog dial 30 in the arrow a' direction, and the marker display (•) of the marker column is moved in the arrow b' direction, i.e., the leftward or downward, with the frame 329 by the rotation operation of the jog dial 30 in the arrow b direction, and by the push operation of the jog dial 30, can set to the mode of the marker displayed marker item (•) of the marker column 300.

Thus, when the jog dial 30 is rotation operated in the arrow a direction under the condition in which the menu item "Shutter speed" is selected, the CPU 50 successively moves from the marker column 300 of the marker item "Auto" to the arrow a' direction, i.e., the marker items in the rightward direction, "1/100", and "Hold". And when the jog dial 30 is push operated, the CPU 50 sets to the mode of marker displayed (•) marker item.

Next, the CPU 50, returning again to the camera setting utility screen 320 and the jog dial window 300 of the selection mode (FIG. 27), repeats the adjustment of setting value to the next menu item as described above. And when all setting procedures for the desired menu items are terminated, the CPU 50 closes the camera setting utility screen 320 based on the click operation of "OK" button 324 by the user and terminates the setting condition adjustment processing.

Figure 30:
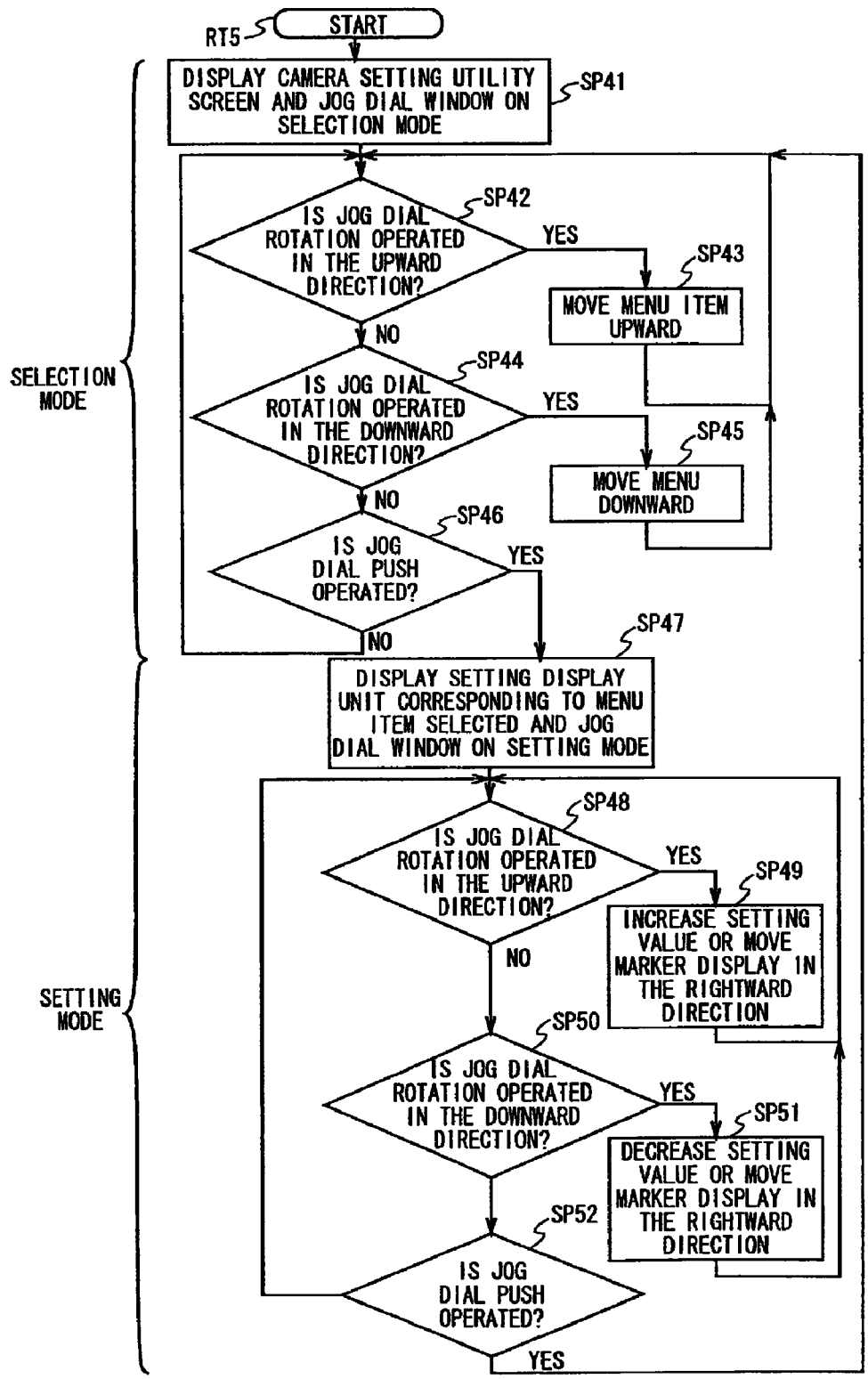
FIG. 30 is a flow chart showing the setting condition adjusting processing procedure of the menu item using the jog dial.

Then, the menu item setting condition adjustment processing procedure in utilizing the jog dial 30 will be described referring to a flow chart of FIG. 30 in the paragraphs that follow. The CPU 50 of the notebook PC attached with jog dial enters firstly from the starting step of the routine RT5 and moves to the step SP41.

At the step SP41, the CPU 50 displays the camera setting utility screen 320 (FIG. 27) and the jog dial window 300 in the selection mode on the liquid crystal display 21 based on the jog dial utility program, and moves to the following step SP42.

At the step SP42, the CPU 50 judges whether the jog dial 30 is rotation operated upward (in the direction of an arrow a) or not. At this point, if an affirmative result is obtained, this means that the jog dial 30 is rotation operated in the upward direction and at this point, the CPU 50 moves to the following step SP43.

At the step SP43, the CPU 50 transfers the menu item displayed on the item display unit 301 of the jog dial window 300 in the selection mode in the upward direction corresponding to the rotation operation of the jog dial 30 and returns again to the step SP42.

On the other hand, if a negative result is obtained at the step SP42, this means that the jog dial 30 has not been rotation operated in the upward direction by the user, and at this moment, the CPU 50 moves to the following step SP44.

At the step SP44, the CPU 50 judges whether the jog dial 30 is rotation operated in the downward direction (an arrow b direction) or not. And at this point, if an affirmative result is obtained, this shows that the jog dial 30 is rotation operated in the downward direction, and at this moment, the CPU 50 moves to the following step SP45.

At the step SP45, the CPU 50 moves the menu item displayed on the item display unit 301 of the jog dial window 300 in the selection mode in the downward direction corresponding to the rotation operation of the jog dial 30, and returns again to the step SP42.

On the other hand, if a negative result is obtained at the step SP44, this shows that the jog dial 30 has not been rotation operated in the downward direction by the user, and at this moment, the CPU 50 moves to the following step SP46.

At the step SP46, the CPU 50 judges whether the jog dial 30 has been push operated or not under the condition in which the user desired menu item is placed in the recognition frame 302 in the item display unit 301.

At this point, if a negative result is obtained, this shows that neither the jog dial has been push operated nor the menu item selection by the user has been executed. And at this moment, the CPU 50 returns to the step SP42 and repeats the processing by the selection mode.

On the other hand, if an affirmative result is obtained at the step SP46, this shows that the jog dial 30 has been push operated by the user, and at this moment the CPU 50 terminates the processing of selection mode and moves to the following step SP47.

At the step SP47, the CPU 50, displaying the setting display unit 322 (or 331) corresponding to the menu item selected in response to the push operation of jog dial 20 on the camera setting utility screen 320, displays the jog dial window 350 (or 360) at the setting mode, and moves to the following step SP48.

At the step SP48, the CPU 50 judges whether the jog dial 30 is push operated in the upward direction (in the direction of an arrow a) by the user referring to the jog dial window 350 (or 360) in the setting mode or not. At this point, if an affirmative result is obtained, this shows that the jog dial 30 is rotation operated in the upward direction, and at this moment the CPU moves to the following step SP49.

At the step SP49, the CPU 50, by moving the slide bar 32 (or the marker display (•) of the marker column 300 in the rightward direction according to the rotation operation of the jog dial 30, increases the setting value (or moves the marker display (•) in the rightward direction) and returns again to the step SP48.

On the other hand, if a negative result is obtained at the step SP48, this shows that the jog dial 30 has not been rotation operated in the upward direction by the user, and at this point, the CPU 50 moves to the following step SP50.

At the step SP50, the CPU 50 judges whether the jog dial 30 has been rotation operated in the downward direction (in the direction of an arrow b) or not. At this point, if an affirmative result is obtained, this shows that the jog dial 30 has been rotation operated in the downward direction, and the CPU 50 moves to the following step SP51.

At the step SP51, the CPU 50, by moving the slide bar 32 (or the marker display (•) of the marker column 300) in the left direction according to the rotation operation of the jog dial 30, decreases the setting value (or moves the marker display (•) in the left direction), and returns again to the step SP48.

On the other hand, if a negative result is obtained at the step SP50, this shows that the jog dial 30 has not been rotation operated in the downward direction by the user, and at this moment the CPU 50 moves to the following step SP52.

At the step SP52, the CPU 50 judges whether the job dial 30 has been push operated or not. At this point, if a negative result is obtained, this shows that the jog dial 30 has not been push operated, and at this point the CPU 50 returns to the step SP48 and repeats the processing in the setting mode.

On the other hand, if an affirmative result is obtained at the step SP52, this shows that the jog dial 30 has been push operated by the user. And at this moment, the adjustment of the setting value to the selected menu item is ended, and the CPU 50 returns to the step SP42 and repeats the processing of selection mode to the next menu item.

(3) Operation and Effects of the Embodiment

According to the foregoing construction, when the menu item of the jog dial window 300 in the selection mode interlocked with the camera setting utility screen 320 is selected corresponding to the rotation operation and the push operation of the jog dial 30 by the user, the notebook PC with jog dial 1 sets the slide bar 323 or the marker display (•) of the marker column 300 corresponding to the menu item selected to the adjustable condition by the rotation operation of the jog dial 30.

Accordingly, when the jog dial 30 is rotation operated by the user, the notebook PC with jog dial 1 moves the slide bar 323 or the marker display (•) corresponding to the rotating direction and the quantity of rotation operation.

Then, when the jog dial 30 is push operated by the user, the notebook PC with jog dial 1 determines the setting value that corresponds to the stop position of the slide bar 323 of that time point, or sets to the mode of marker item marker displayed (•) at that time, and executes the adjustment of setting condition to the other menu items in a similar vein based on the rotation operation and the push operation of the jog dial 30.

According to the foregoing construction, in the notebook PC with jog dial 1, since each item displayed on the camera setting utility screen 320 is selected by the rotation operation and push operation of the jog dial 30, and the slide bar 323 of the selected menu item and the marker display (•) of the marker column 300 will be moved by the rotation operation and the push operation of the jog dial 30 and the setting condition can be adjusted, the overall processing from the selection of menu items to the adjustment of the setting condition can be conducted by rotation operating and push operating the jog dial 30 with one hand as compared with the case of adjusting the setting condition by the drag and drop and click operation by means of mouse and stick 5. Thereby, an user interface having further improved operability can be provided.

(4) Other Embodiments

The embodiment described above has dealt with the case of adjusting the setting condition to the menu item placed on the camera setting utility screen 320 by using the jog dial 30. However, the present invention is not only limited to this but also adjustments of setting conditions of the audio output level in various other setting utility screens and the brightness level of the liquid crystal display 21 can be conducted by the jog dial 30. In this case, the same effects as those of the above can be obtained.

Furthermore, the embodiment described above has dealt with the case of moving the marker display (•) of the marker column 330 displayed on the setting display unit 331 of the camera setting utility screen 320 by the rotation operation of the jog dial 30 and setting according to the push operation. However, the present invention is not only limited to this but also the marker display to the marker box can be moved by the rotation operation of the jog dial 30 and can be set according to the push operation.

Furthermore, the embodiment described above has dealt with the case where the CPU 50, interlocking the jog dial window of selection mode 300, the jog dial window of the setting mode 350 and 360, and the camera setting utility screen 320, executes the adjustment of the setting condition to the menu item selected based on the jog dial utility program 311 stored in advance in the hard disc of the HDD 67. However, the present invention is not only limited to this but also the display processing described above can be conducted by installing the program storage medium on which jog dial utility program is recorded.

Furthermore, as the program storage medium for installing the jog dial utility program for executing a series of display processings described above into the notebook PC with jog dial 1 and which will be used for adjusting to the executable condition by the notebook PC with jog dial 1, not only package media, such as floppy disc, Compact Disc Read-Only Memory (CD-ROM), Digital Versatile Disc (DVD) but also the semiconductor memory and the magnetic disc in which programs are temporarily or permanently stored can be used. Moreover, as the means to store programs in these program storage media, the wired or wireless communication medium such as local area network, Internet and digital satellite broadcasting can be used. And programs can be stored through various kinds of interfaces such as router and modem.

Furthermore, the embodiment described above has dealt with the case of applying the information processing device of the present invention to the notebook PC 1. However, the present invention is not only limited to this but also it can be applied to the desktop personal computer.

Moreover, the embodiment described above has dealt with the case of forming the notebook PC 1 by the CPU 50 as the display means for displaying the setting screen to the prescribed operation object on the display screen, the jog dial 30 as the selection adjusting means for selecting any one of multiple menu items from the setting screen displayed on the display screen by the CPU 50 according to the rotation operation and the push operation, and adjusting the setting condition to the selected menu item, and the CPU 50 as the control means for setting the operation object to the setting condition adjusted by the jog dial 30. However, the present invention is not only limited to this but also the information processing device can be formed by various other display means, selecting/adjusting means and control means.

According to the present invention as described above, since the setting screen for the predetermined object to be operated is displayed on the display screen, and one of multiple menu items from the setting screen displayed is selected according to the rotation operation and the push operation by the predetermined selecting/adjusting means, the setting condition to the menu item selected will be adjusted according to the rotation operation and the push operation by the selecting/adjusting means, and the object to be operated will be set to the setting condition adjusted, the processing from the selection of menu item to the adjustment of setting condition can be conducted only by the rotation operation and the push operation of the selecting/adjusting means. And thereby, the operability can be further improved.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A system comprising:
a camera;
a display screen for displaying a setting screen for said camera to be operated on said display screen;
a jog dial adapted for:
selecting any one of a plurality of menu items from a ring shaped menu on said setting screen displayed on said display screen according to a first rotation operation and a first push operation of said jog dial;
adjusting one of a plurality of setting conditions of the selected menu item displayed on a list menu or items according to a second rotation operation of said jog dial which adjusts a slide bar in a rightward or leftward direction;
selecting a specific setting condition of the selected menu item with a second push operation of said jog dial;
wherein said camera is set to said setting condition adjusted by said jog dial,
wherein said jog dial moves a ring shaped menu in one direction according to a directional rotation operation allowing selection of any one of the plural number of menu items by a push operation,
wherein the push operation of said jog dial allows setting condition indicated by a marker display of the selected menu item on a second menu to be adjusted in accordance with a second direction rotational operation and allows the setting condition to be set with a second push operation of said jog dial,
wherein the second menu shows a specific marker location indicating a current value for each menu item,
wherein the marker display is adjusted in a linear direction in response to the second direction rotational operation of said jog dial, and
wherein each menu item on the ring shaped menu has a coinciding menu item on the second menu.

2. A method for adjusting a camera setting, said method comprising the steps of:
providing said camera on a computer;
displaying a setting screen with regard to said camera to be operated on a display screen of said computer;
selecting any one of plurality of menu items from a ring shaped menu on said setting screen displayed on said display screen according to a first rotation operation and a first push operation of a jog dial mounted on said computer;
adjusting one of a plurality of setting conditions of the selected menu item displayed on a list menu according to a second rotation operation of said jog dial which adjusts a slide bar in a rightward or leftward direction;
selecting a specific setting condition of the selected menu item with a second push operation of said jog dial; and
setting said camera to said setting condition adjusted by said selecting and adjusting steps, wherein said selecting and adjusting steps move a ring shaped menu in one direction according to a directional rotation operation allowing selection of any one of the plural number of menu items by a push operation of said jog dial, wherein the push operation allows setting condition indicated by a marker display of the selected menu item on a second menu to be adjusted in accordance with a second direction rotational operation and allows the setting condition to be set with a second push operation of said jog dial, wherein the second menu shows a specific marker location indicating a current value for each menu item, wherein the marker display is adjusted in a linear direction in response to the second direction rotational operation of said jog dial, and wherein each menu item on the ring shaped menu has a coinciding menu item on the second menu.

3. A non-transitory computer-readable medium having a program stored therein for adjusting a camera setting, said program comprising the steps of:

displaying a setting screen with regard to said camera to be operated on a display screen of a computer comprising said camera;

selecting any one of a plurality of menu items from a ring shaped menu on said setting screen displayed on said display screen at said display step according to a first rotation operation and a first push operation of a jog dial mounted on said computer;

adjusting one of a plurality of setting conditions of the selected menu item displayed on a list menu according to a second rotation operation of said jog dial which adjusts a slide bar in a rightward or leftward direction;

selecting a specific setting condition of the selected menu item with a second push operation of said jog dial; and setting said camera to said setting condition adjusted at said selecting and adjusting steps, wherein said selecting and adjusting steps move a ring shaped menu in one direction according to a directional rotation operation allowing selection of any one of the plural number of menu items by a push operation of said jog dial, wherein the push operation allows setting condition indicated by a marker display of the selected menu item on a second menu to be adjusted in accordance with a second direction rotational operation and allows the setting condition to be set with a second push operation of said jog dial, wherein the second menu shows a specific marker location indicating a current value for each menu item, wherein the marker display is adjusted in a linear direction in response to the second direction rotational operation of said jog dial, and wherein each menu item on the ring shaped menu has a coinciding menu item on the second menu.

\* \* \* \* \*